(12) United States Patent
Nishimura et al.

(10) Patent No.: US 10,873,064 B2
(45) Date of Patent: Dec. 22, 2020

(54) ENERGY STORAGE APPARATUS

(71) Applicants: Blue Energy Co., Ltd., Kyoto (JP); Honda Motor Co., Ltd., Tokyo (JP)

(72) Inventors: Yosuke Nishimura, Kyoto (JP); Kenta Yoshioka, Kyoto (JP)

(73) Assignees: BLUE ENERGY CO., LTD., Kyoto (JP); HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 16/125,216

(22) Filed: Sep. 7, 2018

(65) Prior Publication Data

US 2019/0081300 A1 Mar. 14, 2019

(30) Foreign Application Priority Data

Sep. 12, 2017 (JP) .................................. 2017-175058

(51) Int. Cl.
| | |
|---|---|
| *H01M 2/10* | (2006.01) |
| *H01G 9/10* | (2006.01) |
| *H01M 10/0525* | (2010.01) |
| *H01G 11/80* | (2013.01) |

(52) U.S. Cl.
CPC ............ *H01M 2/1094* (2013.01); *H01G 9/10* (2013.01); *H01G 11/80* (2013.01); *H01M 2/1077* (2013.01); *H01M 10/0525* (2013.01)

(58) Field of Classification Search
CPC ............. H01M 2/1094; H01M 2/1077; H01M 10/0525; H01G 11/80
See application file for complete search history.

(56) References Cited

U.S. PATENT DOCUMENTS

| | | | |
|---|---|---|---|
| 2015/0086818 A1* | 3/2015 | Nishimura | .......... H01M 10/625 429/72 |
| 2015/0140408 A1 | 5/2015 | Hayashida et al. | |
| 2015/0147613 A1 | 5/2015 | Hayashida et al. | |

(Continued)

FOREIGN PATENT DOCUMENTS

| | | |
|---|---|---|
| JP | 2014-035970 A | 2/2014 |
| JP | 2016-031895 A | 3/2016 |
| JP | 2016-081599 A | 5/2016 |

(Continued)

*Primary Examiner* — Jonathan G Jelsma

(74) *Attorney, Agent, or Firm* — McGinn I.P. Law Group, PLLC.

(57) ABSTRACT

An energy storage apparatus includes: a main part; a conductive opposedly facing member disposed to opposedly face the main part; and an insulating member disposed between the main part and the opposedly facing member. The opposedly facing member includes an opposedly facing portion a part of which overlaps with the main part. The opposedly facing portion includes an end surface which overlaps with the main part, the end surface facing upwardly. The insulating member includes: a covering portion covering a surface of the opposedly facing portion directed toward a main part; and a seal portion extending from the covering portion toward the main part. The covering portion includes an end portion disposed at a position which agrees with the end surface or at a position outside the end surface in a direction orthogonal to the end surface. The seal portion extends from the end portion toward the main part.

20 Claims, 16 Drawing Sheets

(56) References Cited

U.S. PATENT DOCUMENTS

2016/0036103 A1     2/2016   Yamamoto et al.
2016/0156006 A1     6/2016   Hoshino et al.

FOREIGN PATENT DOCUMENTS

| JP | 2016-111009 A | 6/2016 |
| WO | WO 2013/179797 A1 | 12/2013 |
| WO | WO 2013/179798 A1 | 12/2013 |

* cited by examiner

FIG. 9
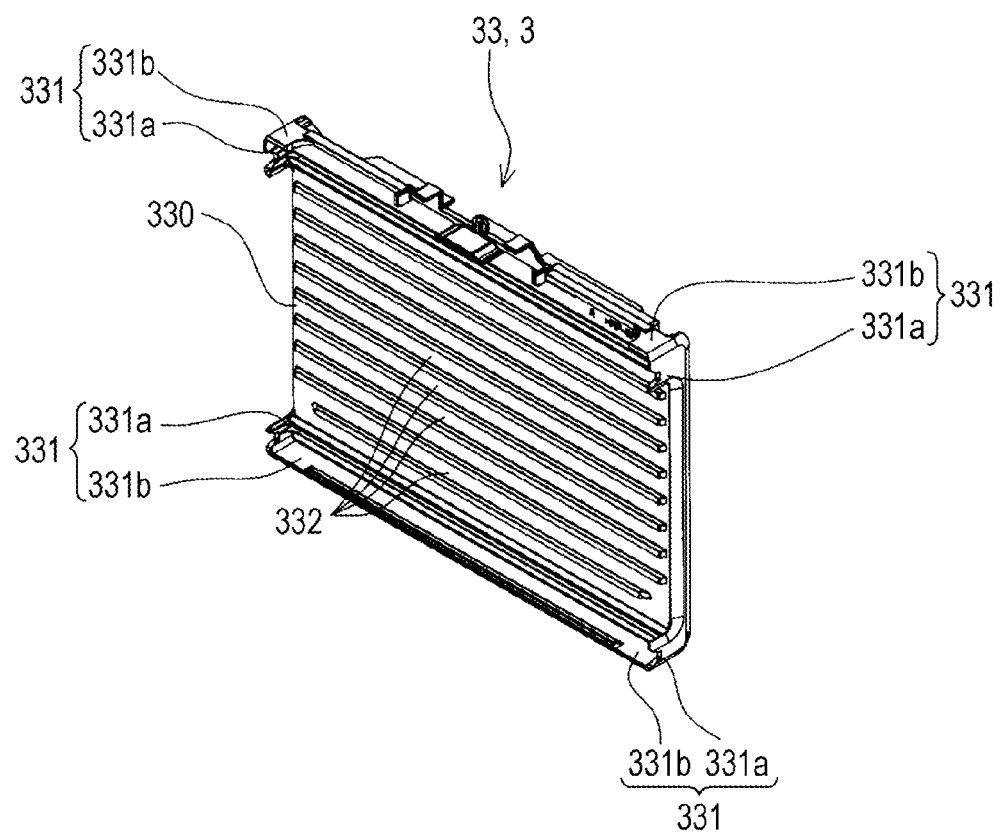
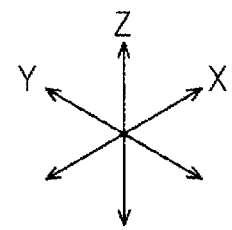

__US 10,873,064 B2__

ENERGY STORAGE APPARATUS

CROSS-REFERENCE TO RELATED APPLICATIONS

This application claims the benefit of Japanese patent application No. 2017-175058 filed on Sep. 12, 2017, which is incorporated by reference.

FIELD

The present invention relates to an energy storage apparatus.

BACKGROUND

Conventionally, there has been provided an energy storage apparatus which includes energy storage devices and a holder which holds the energy storage devices (see JP 2016-111009 A, for example).

In this type of energy storage apparatus, the holder is formed using a conductive material. The energy storage apparatus includes an insulator disposed between the energy storage device and the holder.

The holder includes: a pair of terminal members which is disposed in a spaced-apart manner from each other in a first direction; and frames which connect the pair of terminal members to each other.

The energy storage devices are disposed between the pair of terminal members. The frames opposedly face the energy storage devices in a second direction orthogonal to the first direction. The frames respectively extend in the first direction and have a pair of connecting portions disposed in a spaced-apart manner from each other in a third direction orthogonal to the first direction and the second direction.

The insulator includes: insulating portions which are brought into contact with the connecting portions; and seal portions which extend from middle positions of the insulating portions in the third direction toward the energy storage devices, and close gaps formed between the insulating portions and energy storage devices. With such a configuration, the insulator ensures, in addition to an insulating performance of the insulator per se, a creepage distance between the energy storage device and the frame thus realizing the insulation between the energy storage device and the frame.

The energy storage apparatus having the above-mentioned configuration has a concern that a water droplet which adheres to the energy storage device due to condensation or the like pools on the seal portion, and the water droplet lowers the insulating performance.

To be more specific, in the energy storage apparatus having the above-mentioned configuration, the seal portion of the insulator extends from the middle position of the insulating portion in the third direction. Accordingly, when the energy storage apparatus is disposed with the third direction set to a vertical direction, the seal portion is disposed below an upper end of the insulating portion. As a result, there is a concern that a water droplet which adheres to the energy storage device due to condensation or the like pools on the seal portion disposed between the insulating portion and the energy storage device so that insulating performance is lowered by the water droplet.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Accordingly, it is an object of the present invention to provide an energy storage apparatus which can suppress pooling of a water droplet between a main part including an energy storage device and an opposedly facing member thus suppressing lowering of an insulating performance.

An energy storage apparatus according to an aspect of the present invention includes: a main part including at least one energy storage device; a conductive opposedly facing member disposed so as to opposedly face the main part; and an insulating member disposed between the main part and the opposedly facing member. The opposedly facing member includes an opposedly facing portion where at least a part of the opposedly facing portion overlaps with the main part. The opposedly facing portion includes an end surface disposed at a position where the end surface overlaps with the main part, and the end surface faces upwardly in a state where the energy storage apparatus is installed. The insulating member includes: a covering portion covering at least a surface of the opposedly facing portion directed toward a main part; and a seal portion extending from the covering portion toward the main part so as to close a gap formed between the main part and the covering portion. The covering portion includes an end portion disposed at a position which agrees with the end surface of the opposedly facing portion or at a position outside the end surface in a direction orthogonal to the end surface. The seal portion extends from the end portion of the covering portion toward the main part.

BRIEF DESCRIPTION OF DRAWINGS

The foregoing and other features of the present invention will become apparent from the following description and drawings of an illustrative embodiment of the invention in which:

FIG. 9 is a perspective view of a third neighboring member which the energy storage apparatus includes.

DESCRIPTION OF EMBODIMENTS

Figure 1:
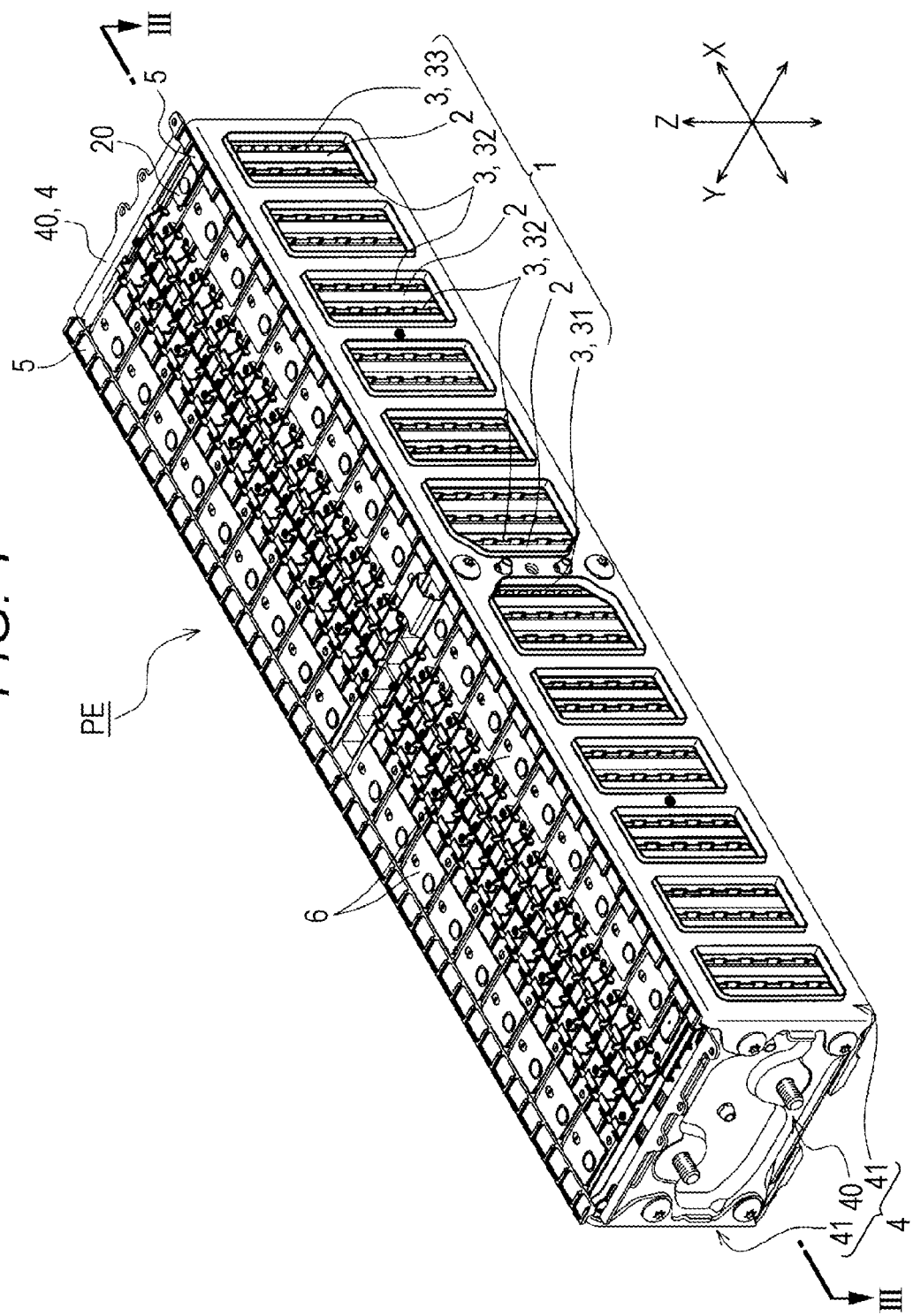
FIG. 1 is a perspective view of an energy storage apparatus according to an embodiment of the present invention.

An energy storage apparatus according to an aspect of the present invention includes: a main part including at least one energy storage device; a conductive oppositely facing member disposed so as to oppositely face the main part; and an insulating member disposed between the main part and the oppositely facing member. The oppositely facing member includes an oppositely facing portion where at least a part of the oppositely facing portion overlaps with the main part. The oppositely facing portion includes an end surface disposed at a position where the end surface overlaps with the main part, the end surface facing upwardly in a state where the energy storage apparatus is installed. The insulating member includes: a covering portion covering at least a surface of the oppositely facing portion directed toward a main part; and a seal portion extending from the covering portion toward the main part so as to close a gap formed between the main part and the covering portion. The covering portion has an end portion disposed at a position which agrees with the end surface of the oppositely facing portion or at a position outside the end surface in a direction orthogonal to the end surface. The seal portion extends from the end portion of the covering portion toward the main part.

With such a configuration, the end portion of the covering portion and the seal portion agree with each other in the direction orthogonal to the direction that the covering portion and the oppositely facing portion are arranged parallel to each other. Accordingly, a space where a water droplet is pooled (a so-called pocket) is not formed between the main part including the energy storage device and the covering portion. Further, the end portion of the covering portion which covers the oppositely facing portion and from which the seal portion extends is disposed at the position which agrees with the end surface of the oppositely facing portion in the direction orthogonal to the direction that the covering portion and the oppositely facing portion are arranged parallel to each other or at the position outside the end surface. Accordingly, a space in which a water droplet is pooled is not also formed between the oppositely facing portion and the covering portion.

Accordingly, in a state where the energy storage apparatus is installed, when a water droplet adhering to the main part including the energy storage device reaches the seal portion, the water droplet is discharged to the outside though the end portion of the covering portion. Accordingly, the energy storage apparatus having the above-mentioned configuration can suppress pooling of a water droplet between the main part including the energy storage device and the oppositely facing member thus suppressing lowering of an insulating performance.

According to an aspect of the present invention, the insulating member may include a rib which extends from the covering portion toward a side opposite to the seal portion and oppositely faces the end surface of the oppositely facing portion. The rib may extend from the end portion of the covering portion or from a position between the end portion of the covering portion and the end surface of the oppositely facing portion in the direction orthogonal to the end surface.

With such a configuration, the rib covers the end surface of the oppositely facing portion and hence, when a water droplet which reaches the seal portion flows to the outside, the rib prevents the adhesion of the water droplet to the oppositely facing portion. Further, the rib which oppositely faces the end surface of the oppositely facing portion extends from the end portion of the covering portion or from a position between the end portion of the covering portion and the end surface of the oppositely facing portion in the direction that the covering portion and the oppositely facing portion are arranged parallel to each other. Accordingly, even when the rib is formed, there is no possibility that the flow of the water droplet is impaired.

Also in this case, the rib may have a proximal end connected to the covering portion and a distal end on a side opposite to the proximal end, and a distal end of the rib may extend to the outside of the oppositely facing portion.

With such a configuration, the rib guides a water droplet to the outside of the oppositely facing portion. Accordingly, the adhesion of a water droplet to the oppositely facing portion can be suppressed.

The rib may include: a first surface which oppositely faces the end surface of the oppositely facing portion and a second surface disposed on a side opposite to the first surface in the direction orthogonal to the end surface. The second surface may be formed so as to be inclined downwardly from a proximal end to the distal end.

With such a configuration, a water droplet flows toward the distal end of the rib due to inclination of the second surface of the rib and hence, it is possible to discharge a water droplet to the outside of the oppositely facing portion with certainty.

As has been described above, according to the present embodiment, it is possible to prevent a water droplet from being pooled between the main part including the energy storage device and the oppositely facing member thus preventing lowering of an insulating performance.

Hereinafter, one embodiment of the present invention is described with reference to drawings. Names of respective constitutional members (respective constitutional elements) of this embodiment are used only for this embodiment, and may differ from names of respective constitutional members (respective constitutional elements) used in BACKGROUND.

Figure 2:
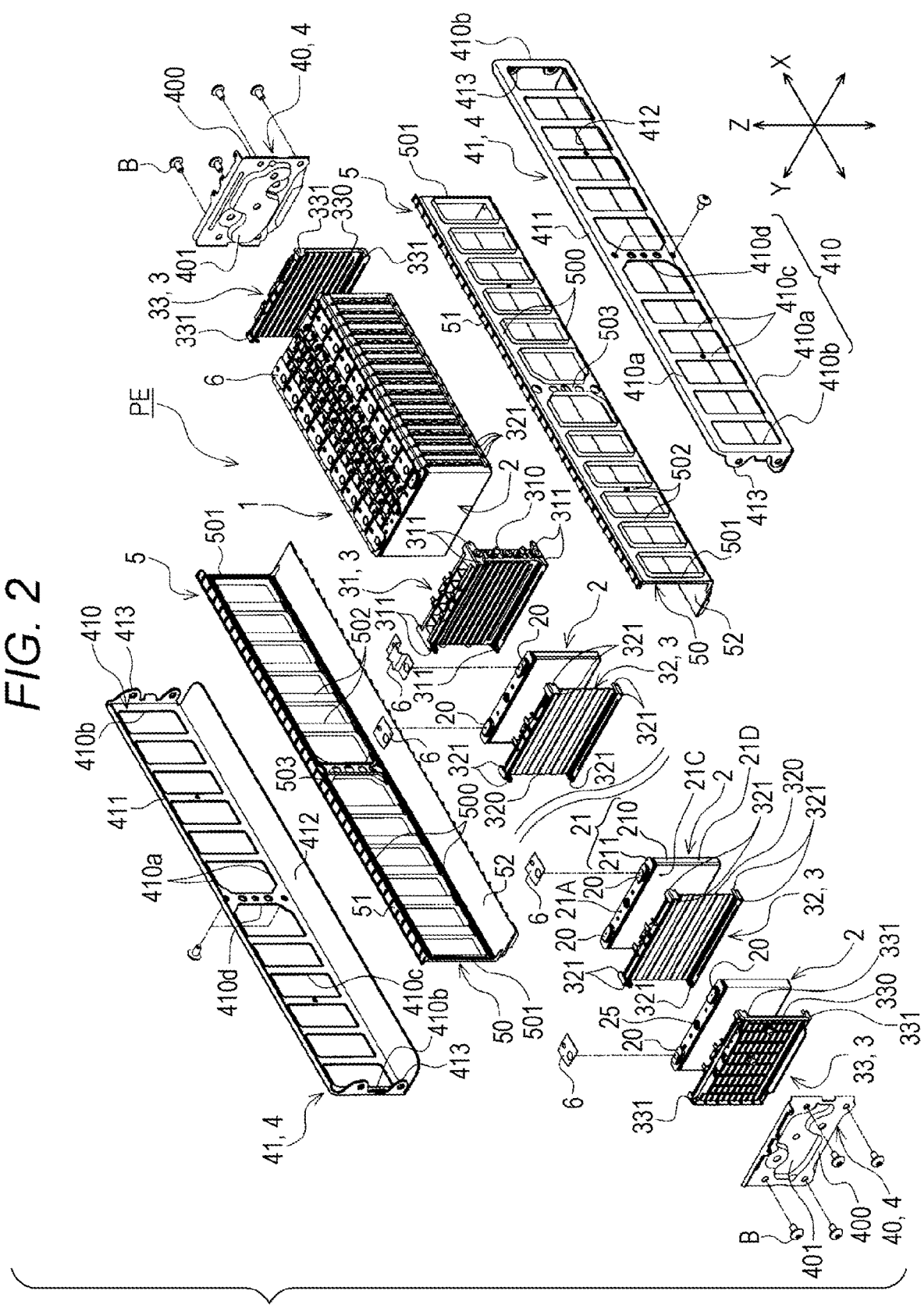
FIG. 2 is an exploded perspective view of the energy storage apparatus with a part omitted.
Figure 3:
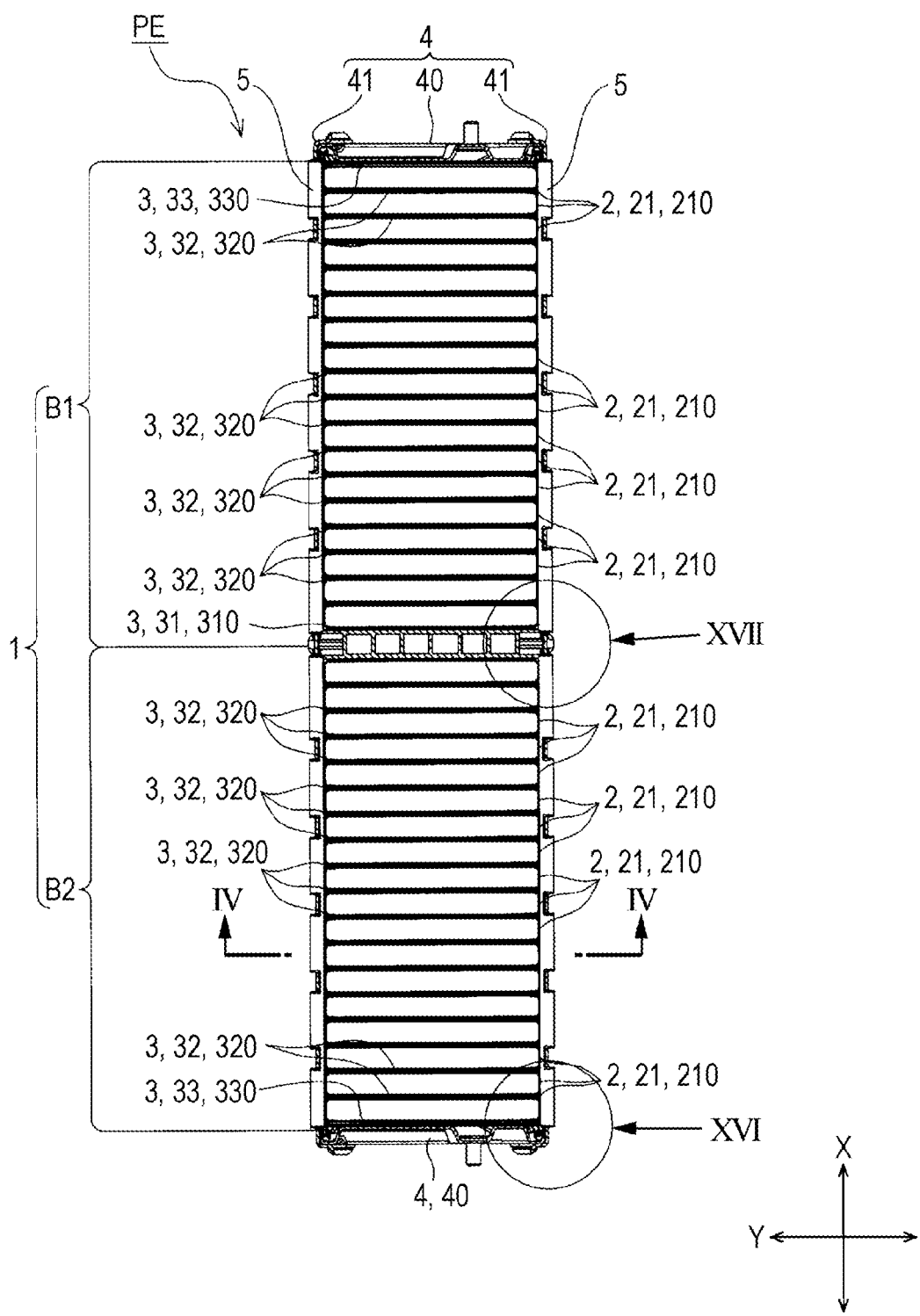
FIG. 3 is a cross-sectional view taken along line III-III in FIG. 1.
Figure 4:
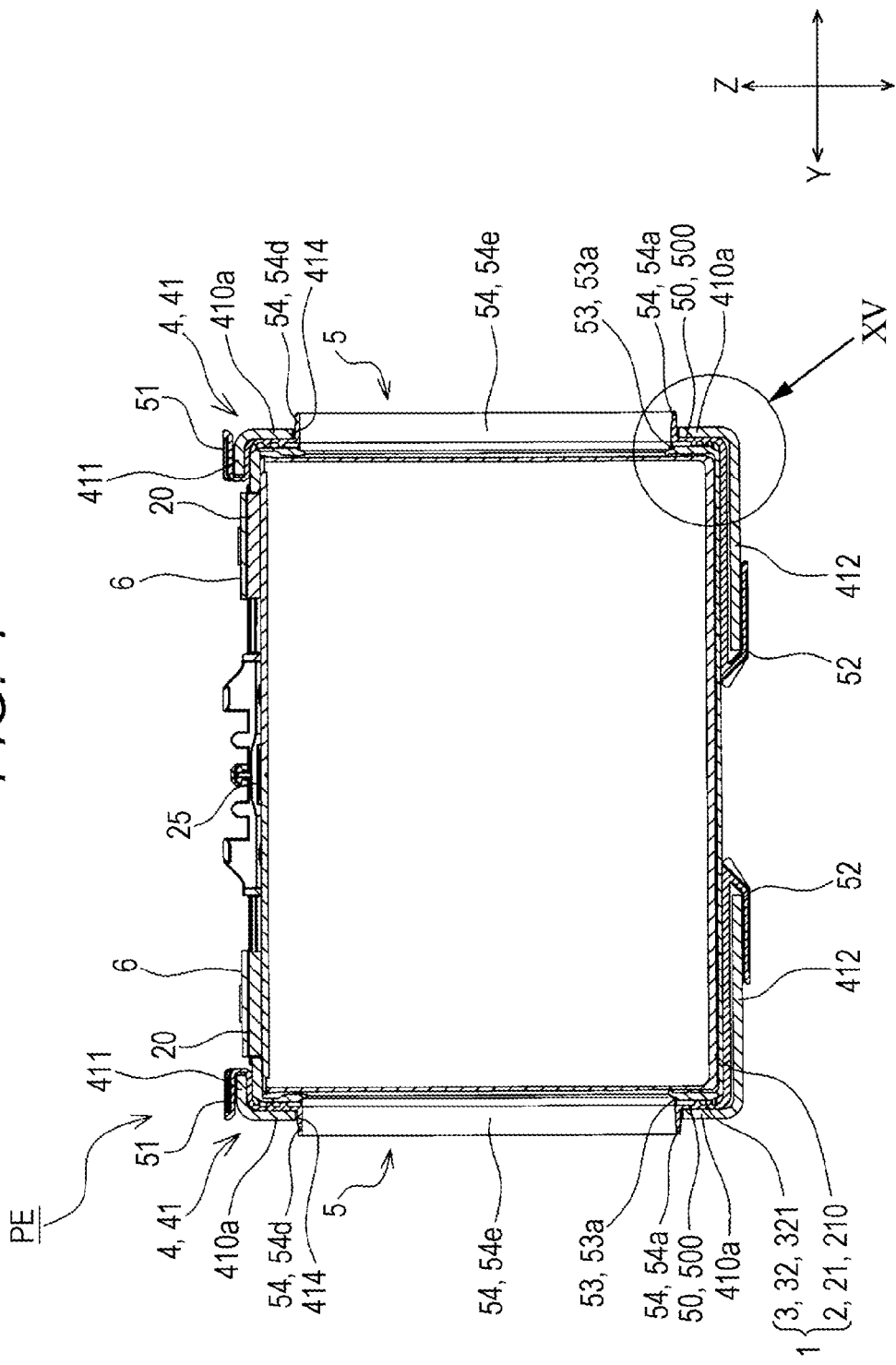
FIG. 4 is a cross-sectional view taken along line IV-IV in FIG. 3.

As shown in FIG. 1 to FIG. 4, an energy storage apparatus PE includes: a main part 1 including energy storage devices 2; oppositely facing members 41 which are disposed so as to oppositely face the main part 1; and insulating members 5 which are disposed between the main part 1 and the oppositely facing members 41. Although FIG. 3 and FIG. 4 are cross-sectional views of the energy storage apparatus PE, for the sake of convenience, the internal configuration of the energy storage device 2 is omitted.

In this embodiment, the main part 1 includes: the energy storage devices 2; and neighboring members 3 which are disposed adjacently to the energy storage devices 2 in a first direction (referred to as an X axis direction in this embodiment). To be more specific, as shown in FIG. 1 to FIG. 3, the main part 1 includes: the plurality of energy storage devices 2 arranged parallel to each other in the X axis direction; and the plurality of neighboring members 3 which are disposed corresponding to the plurality of energy storage devices 2 respectively.

Corresponding to such a configuration, the energy storage apparatus PE according to this embodiment includes a holder 4 which holds the energy storage devices 2 and the neighboring members 3 forming the main part 1. The holder 4 includes the connecting members (oppositely facing members) 41 described later. As shown in FIG. 1 and FIG. 2, the energy storage apparatus PE also includes bus bars 6 which electrically connect the energy storage devices 2 to each other.

As the energy storage device 2, a primary battery, a secondary battery, a capacitor or the like can be used. The energy storage device 2 of this embodiment is a nonaqueous electrolyte secondary battery which can charge electricity or discharge electricity. To be more specific, the energy storage device 2 of this embodiment is a lithium ion secondary battery which makes use of movement of electrons generated by movement of lithium ions.

Figure 5:
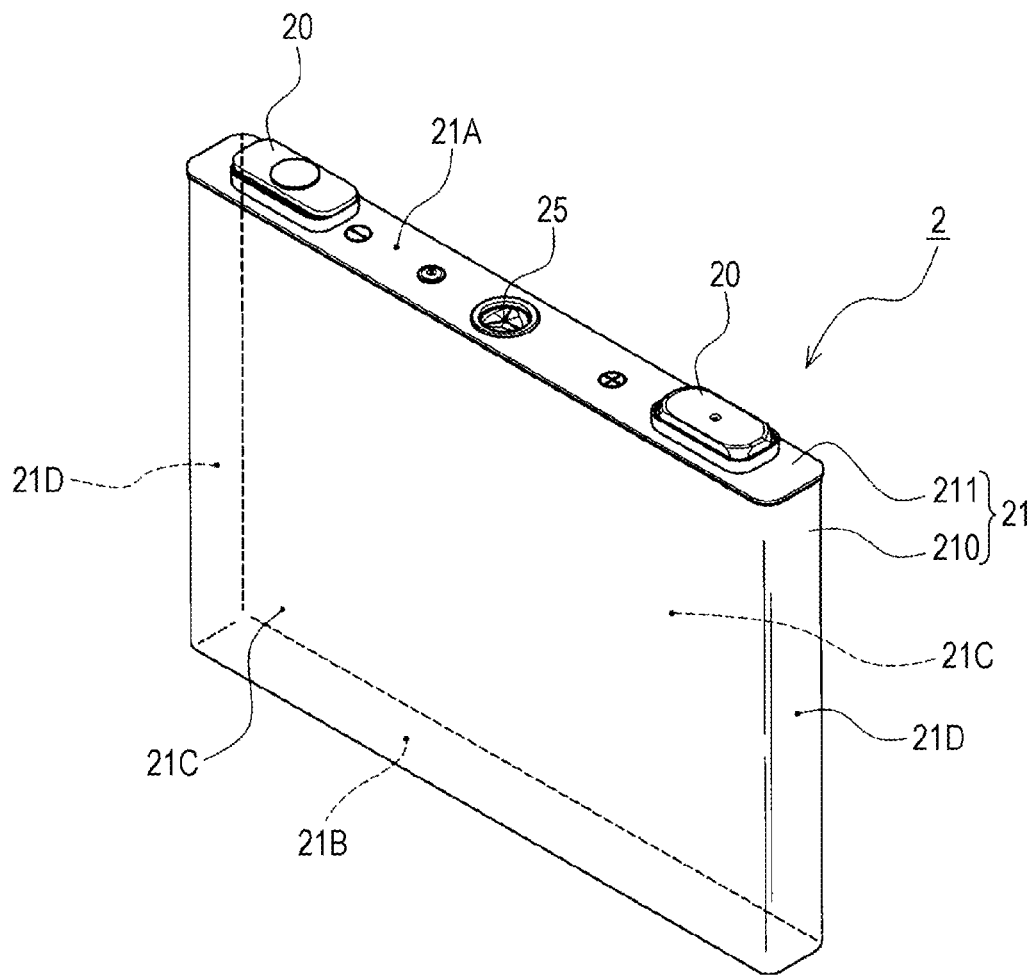
FIG. 5 is a perspective view of an energy storage device which the energy storage apparatus includes.

As shown in FIG. 5, the energy storage device 2 includes external terminals 20. To be more specific, as shown in FIG. 6, the energy storage device 2 includes: an electrode assembly 22; a case 21 which accommodates the electrode assembly 22 together with an electrolyte solution; the external terminals 20 each of which has at least a portion thereof exposed to the outside of the case 21; current collectors 23 which connect the electrode assembly 22 and the external terminals 20 to each other; and an in-case insulator 24 which is disposed between the electrode assembly 22 and the case 21.

The case 21 includes: a case body 210 having an opening; and a lid plate 211 on which the external terminals 20 are disposed and which seals (closes) the opening of the case body 210. In this embodiment, the case body 210 has a bottomed rectangular cylindrical shape. On the lid plate 211, besides the external terminals 20, a safety valve 25 which opens when a pressure in the case 21 exceeds a predetermined value is mounted. The case 21 has a rectangular parallelepiped shape (hexahedron shape). With such a configuration, as shown in FIG. 5, an outer surface of the case 21 includes: a first end surface 21A (an outer surface of the lid plate 211) on which the external terminals 20 are disposed; a second end surface 21B which is directed toward a side opposite to the first end surface 21A in a third direction (referred to as a Z axis direction in this embodiment) orthogonal to the X axis direction and a Y axis direction respectively; a pair of third end surfaces 21C which are directed in directions opposite to each other in the X axis direction; and a pair of fourth end surfaces 21D directed in directions opposite to each other in the Y axis direction.

In this embodiment, the case 21 is formed in a flat shape in the X axis direction. With such a configuration, each of the pair of third end surfaces 21C is a surface having larger width than a width of the first end surface 21A, a width of the second end surface 21B, and a width of the pair of fourth end surfaces 21D. In this embodiment, the plurality of energy storage devices 2 are arranged parallel to each other in the X axis direction in a state where the third end surfaces 21C (wide surfaces) are directed in the X axis direction (see FIG. 2).

Figure 6:
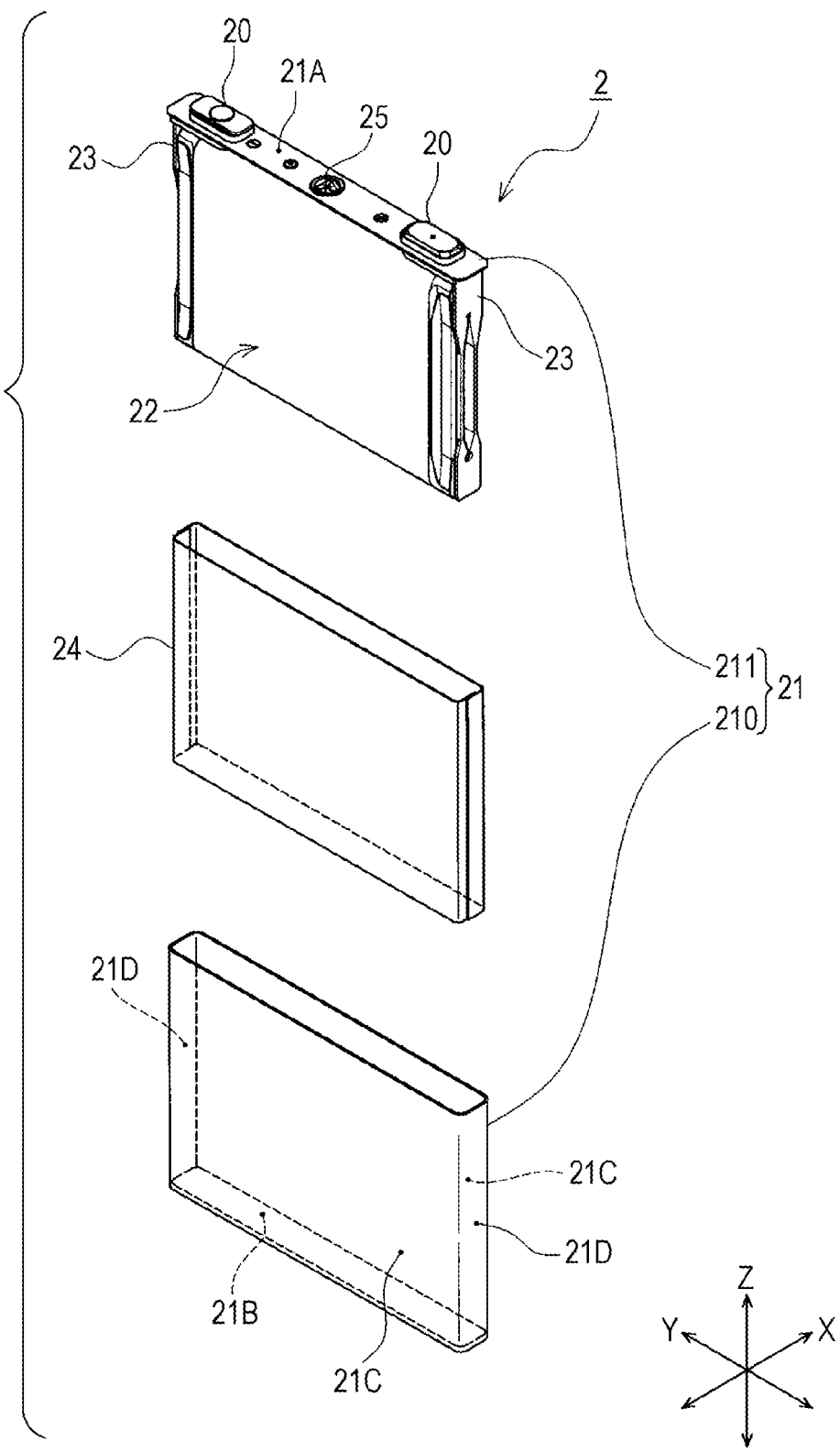
FIG. 6 is an exploded perspective view of the energy storage device.

As shown in FIG. 6, in the electrode assembly 22, positive electrodes and negative electrodes are accommodated in a state where the positive electrode and negative electrode are alternately stacked to each other with a separator interposed therebetween. In this embodiment, the electrode assembly 22 is a so-called winding-type electrode assembly where the elongated positive electrode and the elongated negative electrode are wound together in a state where the positive electrode and the negative electrode are alternately stacked to each other with the separator interposed therebetween. The electrode assembly 22 is accommodated in the case 21 together with an electrolyte solution (not shown in the drawing). With such a configuration, in the electrode assembly 22, lithium ions move between the positive electrode and the negative electrode so that the energy storage device 2 is charged or discharged.

As shown in FIG. 1 to FIG. 3, the neighboring member 3 is disposed between the energy storage devices 2 which are disposed adjacently to each other in the X axis direction or between the energy storage device 2 and a member (a part of the holder 4 in this embodiment) which is disposed adjacently to the energy storage device 2 in the X axis direction. The energy storage apparatus PE of this embodiment includes plural kinds of neighboring members 3. To be more specific, the energy storage apparatus PE includes, as the neighboring members 3, a first neighboring member 31 which is disposed between the energy storage devices 2 which are disposed adjacently to each other at a center position in a direction that the plurality of energy storage devices 2 are arranged parallel to each other, second neighboring members 32 each of which is disposed between the energy storage devices 2 disposed adjacently to each other at positions other than the center position, and third neighboring members 33 which are disposed outside the endmost energy storage devices 2 in the X axis direction.

Figure 7:
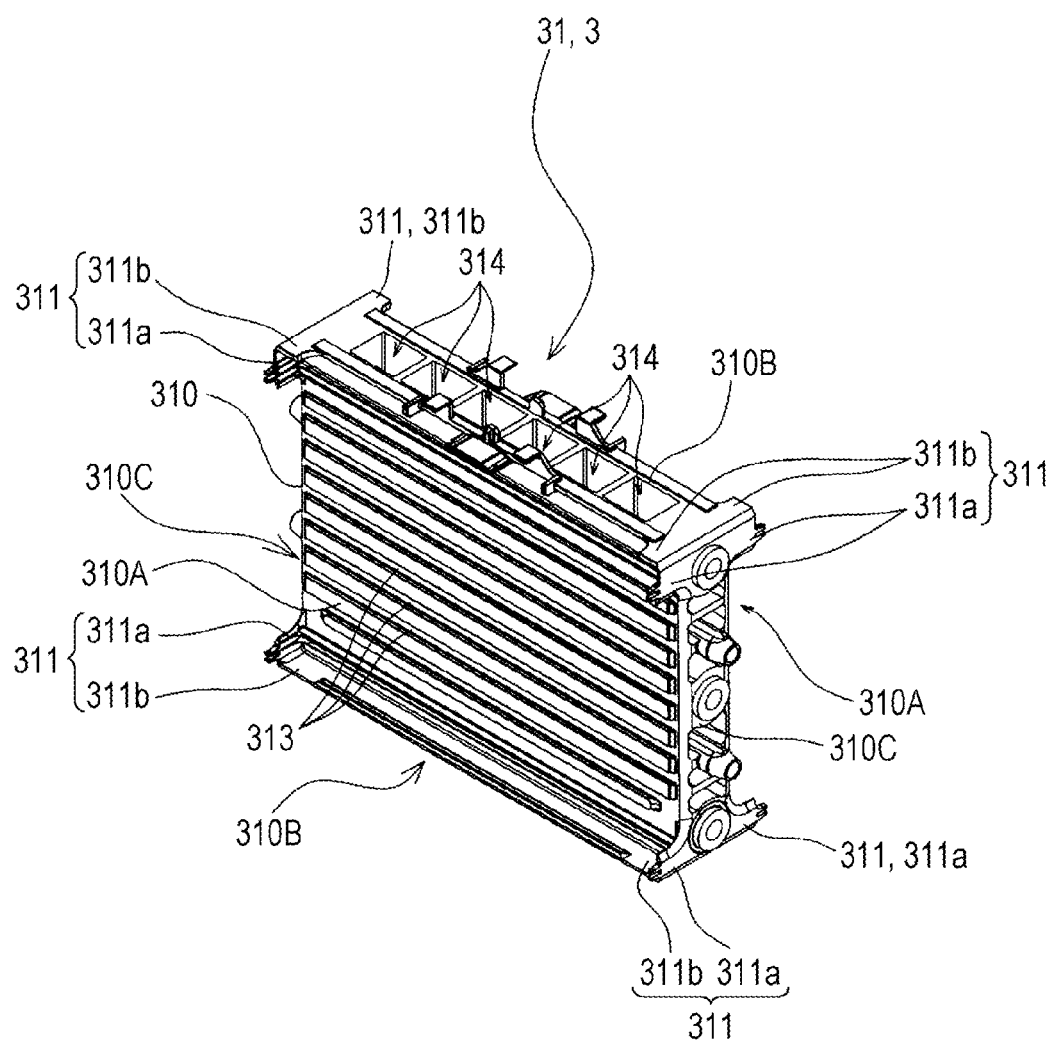
FIG. 7 is a perspective view of a first neighboring member which the energy storage apparatus includes.

The first neighboring member 31 has insulation property and is disposed between the energy storage devices 2 disposed adjacently to each other thus ensuring a gap (creepage distance or the like) between the energy storage devices 2. To be more specific, as shown in FIG. 7, the first neighboring member 31 has: a first body portion 310 which is disposed adjacently to the energy storage devices 2 (case bodies 210); and first restricting portions 311 which restrict the movement of the energy storage devices 2 with respect to the first body portion 310.

The first body portion 310 expands in both the Y axis direction and the Z axis direction, and has a thickness in the X axis direction. With such a configuration, in the first neighboring member 31, the first body portion 310 opposedly faces the third end surfaces 21C of the energy storage devices 2 in the X axis direction. The first body portion 310 of this embodiment forms flow passages which allow a temperature regulating fluid (air in an example of this embodiment) to pass through between the first body portion 310 and the neighboring energy storage devices 2. Further, the first body portion 310 also opposedly faces the insulators 5 in the Y axis direction.

Such a configuration is described in more detail. In the first neighboring member 31, the first body portion 310 has a pair of first surfaces 310A which is directed to the outside in the X axis direction, a pair of second surfaces 310B which is directed to the outside in the Z axis direction, and a pair of third surfaces 310C which is directed to the outside in the Y axis direction.

The shapes of the pair of respective first surfaces 310A of the first body portion 310 as viewed in the X axis direction correspond to the shape of the case 21 of the energy storage device 2 as viewed in the same direction. In this embodiment, the shape of the case 21 (third end surface 21C) of the energy storage device 2 as viewed in the X axis direction is a quadrangular shape. With such a configuration, the first surface 310A of the first body portion 310 also has a quadrangular shape. Accordingly, the first body portion 310 has four corner portions as viewed in the X axis direction. On each of the pair of first surfaces 310A of the first body portion 310, a plurality of grooves 312 for forming the flow passages which allow a fluid to pass therethrough are formed such that the grooves 312 extend in the Y axis direction.

Particularly, the first neighboring member 31 (first body portion 310) is connected to the holder 4. In this embodiment, the first neighboring member 31 is connected (fixed) to the holder 4 (connecting members 41 described later) by threaded engagement (see FIG. 1 to FIG. 3).

The first restricting portions 311 extend in the X axis direction from the first body portion 310, and are brought into contact with the energy storage devices 2 (to be more specific, the cases 21) disposed adjacently to the first body portion 310 from the outside in the Y axis direction and in the Z axis direction respectively thus restricting the movement of the energy storage devices 2 in the Y axis direction and in the Z axis direction relative to the first body portion 310.

To be more specific, the first restricting portions 311 are formed corresponding to four corner portions of the first body portion 310 as viewed in the X axis direction, and are formed along the corresponding corner portions of the first body portion 310.

The first restricting portion 311 includes: a first lug 311a having a thickness in the Y axis direction and extending in the X axis direction from an end portion of the first body portion 310 in the Y axis direction (an end portion extending in the Z axis direction); and a second lug 311b having a thickness in the Z axis direction and extending in the X axis direction from the end portion of the first body portion 310 in the Z axis direction (the end portion extending in the Y axis direction). The first lug 311a has a first end and a second end in the Z axis direction, and the second lug 311b has one end in the Y axis direction. The first end of the first lug 311a and one end of the second lug 311b agree with a corner of the first body portion 310, and are connected to each other.

In this embodiment, the energy storage device 2 is disposed on both sides of the first body portion 310 in the X axis direction respectively. Corresponding to such a configuration, in the first neighboring member 31, the first restricting portion 311 is formed on both sides of the first body portion 310 in the X axis direction respectively.

In this embodiment, the third surface 310C of the first body portion 310 is formed continuously with outer surfaces of the first lugs 311a of the first restricting portions 311. In this embodiment, the third surface 310C of the first body portion 310 includes tapered surfaces (a numeral not given to the tapered surfaces) which are inclined downwardly toward the end portions of the third surface 310C in the X axis direction. That is, the third surface 310C of the first body portion 310 includes a pair of tapered surfaces which is tapered from a center side of the third surface 310C toward both ends of the third surface 310C in the X axis direction. Further, an outer surface of the first lug 311a of the first restricting portion 311 includes a tapered surface which is tapered from a second lug 311b (first end) side toward the second end in the Z axis direction. The tapered surfaces of the third surface 310C of the first body portion 310 and the tapered surfaces of the outer surfaces of the first lugs 311a of the first restricting portions 311 are continuously formed.

Figure 8:
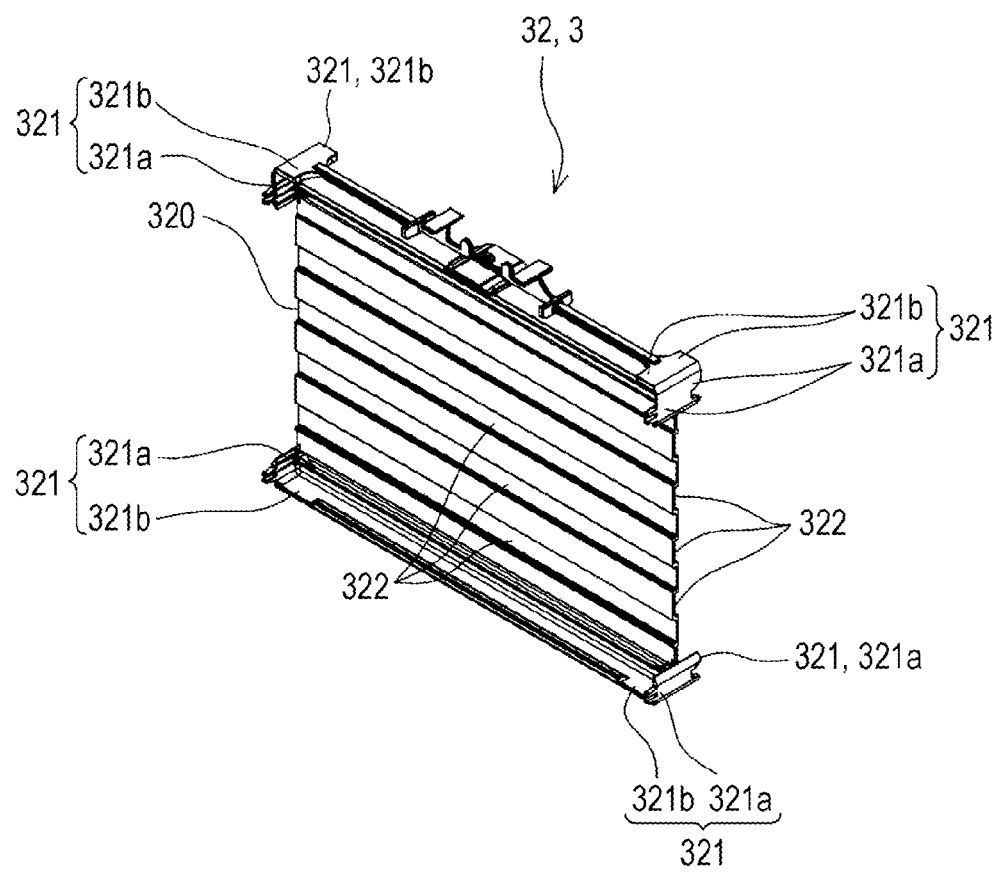
FIG. 8 is a perspective view of a second neighboring member which the energy storage apparatus includes.

The second neighboring member 32 has insulation property and is disposed between the energy storage devices 2 disposed adjacently to each other thus ensuring a gap (creepage distance or the like) between the energy storage devices 2. To be more specific, as shown in FIG. 8, the second neighboring member 32 has: a second body portion 320 which is disposed adjacently to the energy storage devices 2 (case bodies 210); and second restricting portions 321 which restrict the movement of the energy storage devices 2 with respect to the second body portion 320.

The second body portion 320 expands in both the Y axis direction and the Z axis direction. With such a configuration, in the second neighboring member 32, the second body portion 320 opposedly faces the third end surfaces 21C of the energy storage devices 2. The shape of the second body portion 320 as viewed in the X axis direction corresponds to the shape of the case 21 of the energy storage device 2 as viewed in the same direction. In this embodiment, the shape of the case 21 (third end surface 21C) of the energy storage device 2 as viewed in the X axis direction is a quadrangular shape. With such a configuration, the second body portion 320 also has a quadrangular shape as viewed in the X axis direction. Accordingly, the second body portion 320 has four corner portions as viewed in the X axis direction.

The second body portion 320 of this embodiment forms flow passages which allow a temperature regulating fluid (air in an example of this embodiment) to pass through between the second body portion 320 and the neighboring energy storage devices 2. In this embodiment, the second body portion 320 has a small thickness, and is formed into a rectangular wave shape as viewed in the Y axis direction. With such a configuration, a plurality of groove portions 322 which form flow passages for a fluid are formed on both surfaces of the second body portion 320 in the X axis direction such that the groove portions 322 extend in the Y axis direction.

The second restricting portions 321 extend in the X axis direction from the second body portion 320, and are brought into contact with the energy storage devices 2 (to be more specific, the cases 21) disposed adjacently to the second body portion 320 from the outside in the Y axis direction and in the Z axis direction respectively thus restricting the movement of the energy storage devices 2 in the Y axis direction and in the Z axis direction relative to the second body portion 320.

To be more specific, the second restricting portions 321 are formed corresponding to four corner portions of the second body portion 320 as viewed in the X axis direction, and are formed along the corresponding corner portions of the second body portion 320.

The second restricting portion 321 includes: a first lug 321a having a thickness in the Y axis direction and extending in the X axis direction from an end portion of the second body portion 320 in the Y axis direction (an end portion extending in the Z axis direction); and a second lug 321b having a thickness in the Z axis direction and extending in the X axis direction from an end portion of the second body portion 320 in the Z axis direction (an end portion extending in the Y axis direction). The first lug 321a has a first end and a second end in the Z axis direction, and the second lug 321b has one end in the Y axis direction. The first end of the first lug 321a and one end of the second lug 321b agree with a corner of the second body portion 320, and are connected to each other.

In this embodiment, the energy storage device 2 is disposed on both sides of the second body portion 320 in the X axis direction respectively. Corresponding to such a configuration, in the second neighboring member 32, the second restricting portion 321 is formed on both sides of the second body portion 320 in the X axis direction respectively.

In this embodiment, the energy storage devices 2 and the second neighboring members 32 are disposed such that the energy storage device 2 and the second neighboring member 32 are alternately arranged in the X axis direction (see FIG. 1 to FIG. 3). Corresponding to such a configuration, the second restricting portions 321 of one second neighboring member 32 are disposed continuously with the second restricting portions 321 of the other second neighboring member 32 which is disposed adjacently to one second neighboring member 32 with the energy storage device 2 sandwiched therebetween in the X axis direction. That is, outer surfaces of the first lugs 321a of the corresponding second restricting portions 321 of the second neighboring members 32 which are disposed adjacently to each other with the energy storage device 2 sandwiched therebetween form a continuous surface, and outer surfaces of the second lugs 321b of the corresponding second restricting portions 321 of the second neighboring members 32 disposed adjacently to each other with the energy storage device 2 sandwiched therebetween form a continuous surface.

In this embodiment, the neighboring member 3 includes the first neighboring member 31. Accordingly, among the second neighboring members 32, there are second neighboring members 32 each of which is disposed adjacently to the energy storage device 2 which is disposed adjacently to the first neighboring member 31. The second restricting portions 321 (the second restricting portions 321 disposed on one side out of the second restricting portions 321 disposed on both sides of the second body portion 320) of such a second neighboring member 32 are disposed continuously with the first restricting portions 311 of the first neighboring member 31 in the X axis direction.

That is, with respect to the first neighboring member 31 and the second neighboring member 32 which are disposed adjacently to each other with the energy storage device 2 sandwiched therebetween, the outer surface of the first lug 311a of the first restricting portion 311 of the first neighboring member 31 and the outer surface of the first lug 321a of the second restricting portion 321 of the second neighboring member 32 corresponding to the outer surface of the first lug 311a form a continuous surface, and the outer surface of the second lug 311b of the first restricting portion 311 of the first neighboring member 31 and the outer surface of the second lug 321b of the second restricting portion 321 of the second neighboring member 32 corresponding to the outer surface of the second lug 311b form a continuous surface. In this embodiment, the outer surface of the first lug 321a of the second restricting portion 321 (the outer surface forming the continuous surface) includes a tapered surface which is inclined downwardly from a second lug 321b side toward a distal end in the Z axis direction.

The third neighboring member 33 has insulation property and is disposed between the energy storage device 2 and the holder 4 (terminal member 40 described later) in the X axis direction thus ensuring a gap (creepage distance or the like) between the energy storage device 2 and the holder 4 (terminal member 40). To be more specific, as shown in FIG. 9, the third neighboring member 33 has a third body portion 330 which is disposed adjacently to the energy storage device 2 (case body 210), and third restricting portions 331 which restrict movement of the energy storage device 2 with respect to the third body portion 330.

The third body portion 330 expands in both the Y axis direction and the Z axis direction, and has a thickness in the X axis direction. With such a configuration, in the third neighboring member 33, the third body portion 330 opposedly faces the third end surface 21C of the energy storage device 2 in the X axis direction. The shape of the third body portion 330 as viewed in the X axis direction corresponds to the shape of the case 21 of the energy storage device 2 as viewed in the same direction. In this embodiment, the shape of the case 21 (third end surface 21C) of the energy storage device 2 as viewed in the X axis direction is a quadrangular shape. With such a configuration, the third body portion 330 also has a quadrangular shape as viewed in the X axis direction. Accordingly, the third body portion 330 has four corner portions as viewed in the X axis direction.

The third body portion 330 of this embodiment forms flow passages which allow a temperature regulating fluid (air in an example of this embodiment) to pass through between the third body portion 330 and the neighboring energy storage device 2. In this embodiment, on a surface of the third body portion 330 directed toward an energy storage device 2 side, a plurality of groove portions 332 which form flow passages for a fluid are formed such that the groove portions 332 extend in the Y axis direction.

Each of the third restricting portions 331 extends in the X axis direction from the third body portion 330, and is brought into contact with the energy storage device 2 (to be more specific, the case 21) disposed adjacently to the third body portion 330 from the outside in the Y axis direction and in the Z axis direction respectively thus restricting the movement of the energy storage device 2 in the Y axis direction and in the Z axis direction relative to the third body portion 330.

To be more specific, the third restricting portions 331 are formed corresponding to four corner portions of the third body portion 330 as viewed in the X axis direction, and are formed along the corresponding corner portions of the third body portion 330.

The third restricting portions 331 includes: a first lug 331a having a thickness in the Y axis direction and extending in the X axis direction from an end portion of the third body portion 330 in the Y axis direction (an end portion extending in the Z axis direction); and a second lug 331b having a thickness in the Z axis direction and extending in the X axis direction from an end portion of the third body portion 330 in the Z axis direction (an end portion extending in the Y axis direction). The first lug 331a has a first end and a second end in the Z axis direction, and the second lug 331b has one end in the Y axis direction. The first end of the first lug 331a and one end of the second lug 331b agree with a corner of the third body portion 330, and are connected to each other.

In this embodiment, the energy storage device 2 is disposed on one side of the third body portion 330 in the X axis direction. Corresponding to such a configuration, in the third neighboring member 33, the third restricting portions 331 are formed on one side of the third body portion 330 in the X axis direction. The third restricting portions 331 of the third neighboring member 33 are disposed continuously with the second restricting portions 321 of the second neighboring member 32 which is disposed adjacently to the third neighboring member 33 with the energy storage device 2 sandwiched therebetween in the X axis direction.

That is, in a state where the third neighboring member 33 and the second neighboring member 32 are disposed adjacently to each other with the energy storage device 2 sandwiched therebetween, outer surfaces of the first lugs 331a of the third restricting portions 331 of the third neighboring member 33 and corresponding outer surfaces of the first lugs 321a of the second restricting portions 321 of the second neighboring member 32 form continuous surfaces, and outer surfaces of the second lugs 331b of the third restricting portions 331 of the third neighboring member 33 and corresponding outer surfaces of the second lugs 321b of the second restricting portions 321 of the second neighboring member 32 form continuous surfaces.

In this manner, the first restricting portions 311 of the first neighboring member 31, the second restricting portions 321 of the second neighboring members 32, and the third restricting portions 331 of the third neighboring members 33 are continuously formed with each other thus covering the corner portions of the cases 21 of the plurality of energy storage devices 2 (the connecting portions between the first end surfaces 21A and the third end surfaces 21C and the connecting portions between the second end surfaces 21B and the third end surfaces 21C).

In this embodiment, both outer surfaces of the third body portion 330 directed to the outside in the Y axis direction are formed continuously with outer surfaces of the first lugs 331a of the third restricting portions 331. In this embodiment, the outer surface of the third body portion 330 directed to the outside in the Y axis direction includes a tapered surface which is inclined downwardly toward a main part 1 (energy storage device 2) side in the X axis direction. The outer surface (the outer surface forming a continuous surface) of the first lug 331a of the third restricting portion 331 includes a tapered surface which is inclined downwardly from a second lug 331b side toward a distal end in the Z axis direction. The tapered surfaces of the outer surfaces of the third body portion 330 and the tapered surfaces of the outer surfaces of the first lugs 331a of the third restricting portions 331 are continuously formed.

As shown in FIG. 1 to FIG. 3, the holder 4 collectively holds the plurality of energy storage devices 2 and the plurality of neighboring members 3 by surrounding the periphery of the plurality of energy storage devices 2 and the periphery of the plurality of neighboring members 3. The holder 4 is formed of members made of a material having conductivity such as metal. To be more specific, the holder 4 includes: a pair of terminal members 40 which is disposed on both sides of a unit formed of the plurality of energy storage devices 2 which are arranged in the X axis direction; and connecting members (oppositely facing members) 41 which are disposed so as to oppositely face the main part 1 (energy storage devices 2 and neighboring members 3) and connect the pair of terminal members 40 to each other.

Each of the pair of terminal members 40 is disposed such that the third neighboring member 33 is sandwiched between the terminal member 40 and the energy storage device 2 disposed at an end in the X axis direction. The terminal member 40 expands in both the Y axis direction and the Z axis direction. To be more specific, as shown in FIG. 2, the terminal member 40 includes: a body 400 having a profile corresponding to the energy storage device 2 (a rectangular profile in this embodiment); and a pressure contact portion 401 which projects toward the third body portion 330 of the third neighboring member 33 from the body 400 and is brought into contact with the third neighboring member 33 thus pressing the third neighboring member 33.

Figure 10:
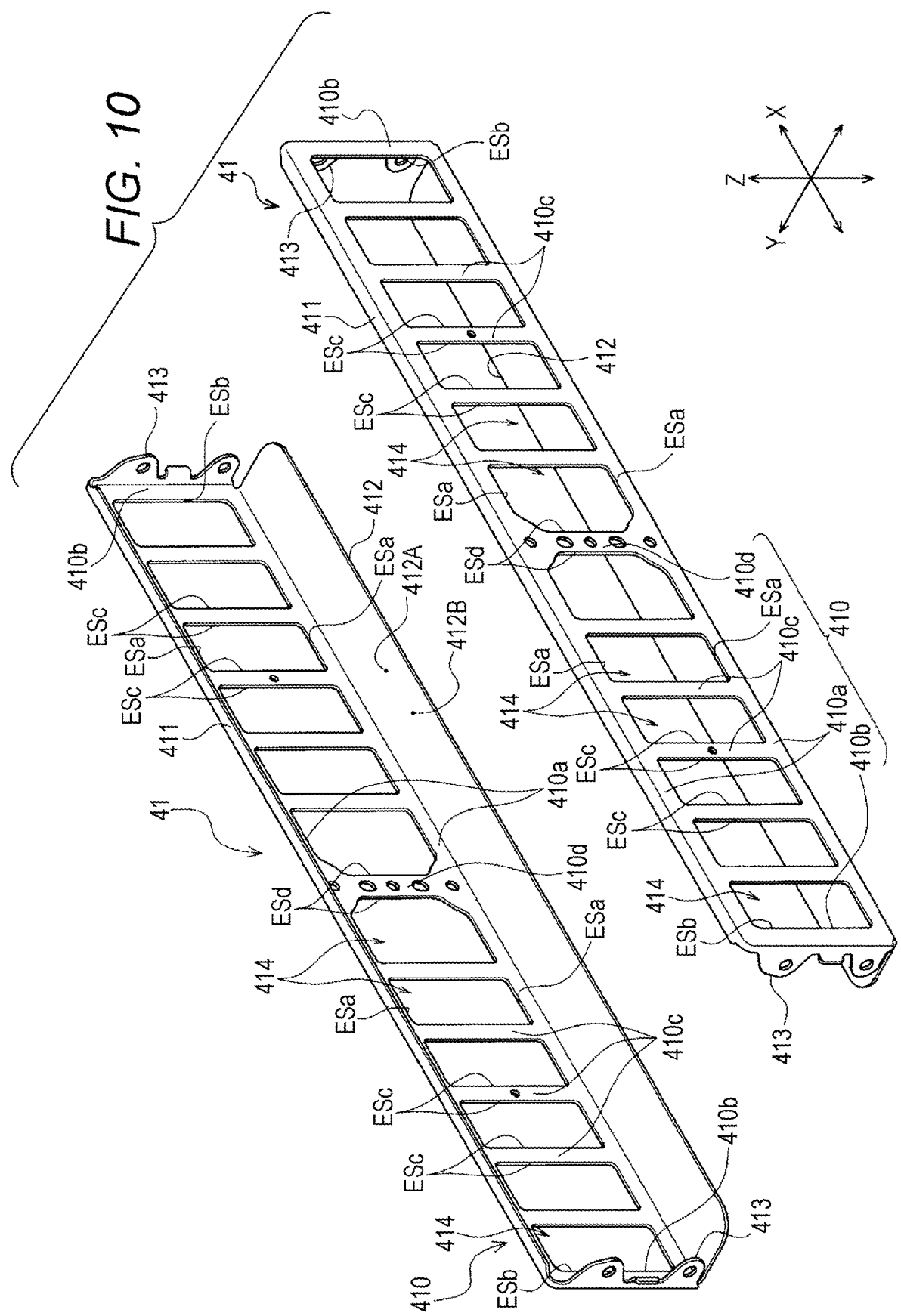
FIG. 10 is a perspective view of a pair of connecting members which the energy storage apparatus includes.

The pair of connecting members 41 is disposed on both sides of the main part 1 in the Y axis direction. Each of the pair of connecting members 41 has oppositely facing portions 410a, 410b, 410d where at least a part of each oppositely facing portion overlaps with the main part 1. To be more specific, as shown in FIG. 2 and FIG. 10, each of the pair of connecting members 41 has: a body portion 410 which overlaps with the main part 1 in the Y axis direction; a first extending portion 411 which extends from the body portion 410 along the first end surfaces 21A of the energy storage devices 2 included in the main part 1; a second extending portion 412 which extends from the body portion 410 along the second end surfaces 21B of the energy storage devices 2 included in the main part 1; and terminal extending portions 413 which extend from the body portion 410 along the terminal members 40.

The body portion 410 is a plate-like portion which is disposed in a spaced apart manner from the main part 1 in the Y axis direction. As shown in FIG. 10, the body portion 410 of this embodiment has a plate shape expanding in the X axis direction and in the Z axis direction, and has a rectangular profile elongated in the X axis direction. Each body portion 410 has: a pair of beam portions 410a which extends in the X axis direction and is disposed in a spaced apart manner from each other in the Z axis direction; a pair of first connecting portions 410b which extends in the Z axis direction and connects end portions of the pair of beam portions 410a to each other; second connecting portions 410c which extend in the Z axis direction and connect the pair of beam portions 410a to each other at intermediate positions in the X axis direction (in an example of this embodiment, at positions overlapping with predetermined energy storage devices 2 among the plurality of energy storage devices 2 arranged parallel to each other in the X axis direction as viewed in the Y axis direction); and a third connecting portion 410d which extends in the Z axis direction and connects the pair of beam portions 410a to each other at an intermediate position in the X axis direction (in an example of this embodiment, at a position overlapping with the first neighboring member 31 disposed at an intermediate position in the X axis direction as viewed in the Y axis direction).

One beam portion 410a out of the pair of beam portions 410a extends in the X axis direction along end portions of the fourth end surfaces 21D on a first end surface 21A side of the plurality of energy storage devices 2 included in the main part 1. To the contrary, the other beam portion 410a out of the pair of beam portions 410a extends in the X axis direction along end portions of the fourth end surfaces 21D on a second end surface 21B side of the plurality of energy storage devices 2 included in the main part 1. With such a configuration, the pair of respective beam portions 410a overlaps with the main part 1 (the plurality of energy storage devices 2 and the neighboring members 3) as viewed in the Y axis direction. The pair of beam portions 410a respectively has a strip plate shape. With such a configuration, the pair of respective beam portions 410a has end surfaces ESa which are directed in the Z axis direction and oppositely faces each other. The end surfaces ESa of the beam portion 410a are disposed at positions overlapping with the main part 1 in the Y axis direction.

The first connecting portions 410b extend in the Z axis direction, and connect the end portions of the pair of beam portions 410a to each other. The first connecting portion 410b has a plate shape, and has a thickness in the Y axis direction. With such a configuration, the first connecting portions 410b respectively have an end surface ESb which faces in the X axis direction on one end in the X axis direction. That is, each of the pair of first connecting portions 410b has the end surface ESb which is directed toward a counter-part first connecting portion 410b side. The end surfaces ESb of the first connecting portions 410b are disposed at positions overlapping with the main part 1 (third neighboring member 33) in the Y axis direction.

The plurality of second connecting portions 410c are disposed in a spaced apart manner from each other in the X axis direction. The plurality of respective second connecting portions 410c extend in the Z axis direction, and connect the pair of beam portions 410a to each other. Each of the plurality of second connecting portions 410c has a plate shape, and has a thickness in the Y axis direction. With such a configuration, each of the plurality of second connecting portions 410c has end surfaces ESc which are directed in opposite directions in the X axis direction on both ends in the X axis direction. That is, each of the plurality of second connecting portions 410c has the end surfaces ESc which are directed toward a neighboring second connecting portion 410c side in the X axis direction. The end surfaces ESc of the second connecting portions 410c are disposed at positions overlapping with the main part 1 (energy storage device 2) in the Y axis direction.

The third connecting portion 410d extends in the Z axis direction, and connects the center portions of the pair of beam portions 410a in the X axis direction. The third connecting portion 410d has a plate shape, and has a thickness in the Y axis direction. With such a configuration, the third connecting portion 410d has end surfaces ESd which are directed in opposite directions in the X axis direction on both ends in the X axis direction. That is, the third connecting portion 410d has the end surfaces ESd which are directed toward neighboring second connecting portions 410c in the X axis direction. The end surfaces ESd of the third connecting portion 410d are disposed at positions overlapping with the main part 1 (first neighboring member 31) in the Y axis direction.

In this embodiment, the end surfaces ESb of the first connecting portions 410b, the end surfaces ESc of the second connecting portions 410c, and the end surfaces ESd of the third connecting portion 410d are respectively continuously formed with the respective end surfaces ESa of the pair of beam portions 410a. In this embodiment, connecting portions between the end surfaces ESb of the first connecting portions 410b, the end surfaces ESc of the second connecting portions 410c, the end surfaces ESd of the third connecting portion 410d and the end surfaces ESa of the beam portions 410a are respectively formed in an arcuate surface.

The first connecting portions 410b are disposed so as to overlap with the third neighboring members 33 included in the main part 1 in the Y axis direction. The plurality of second connecting portions 410c are disposed between the first connecting portions 410b and the third connecting portion 410d. The second connecting portions 410c are disposed so as to overlap with the energy storage devices 2 included in the main part 1 in the Y axis direction. That is, the second connecting portions 410c are disposed so as to avoid regions where inlets and outlets of the flow passages for a fluid formed by the neighboring members 3 (second neighboring members 32) are formed.

The third connecting portion 410d is disposed at a position overlapping with the first neighboring member 31 included in the main part 1 in the Y axis direction. To be more specific, the third connecting portion 410d is disposed such that a center line of the third connecting portion 410d extending in the Z axis direction agrees with or substantially agrees with a center line of the first body portion 310 (third surface 310C) of the first neighboring member 31 extending in the Z axis direction. Based on the above-mentioned configuration, a width of the third connecting portion 410d is set smaller than a thickness (an outer size in the X axis direction) of the first body portion 310 of the first neighboring member 31. That is, the third connecting portion 410d is disposed so as to avoid regions where inlets and outlets of the flow passages for a fluid formed by the first neighboring member 31 are formed.

In this manner, the pair of beam portions 410a is connected to each other by the first connecting portions 410b, the plurality of second connecting portions 410c, and the third connecting portion 410d and hence, the body portion 410 is formed into a ladder shape. With such a configuration, the body portion 410 has a plurality of rectangular-shaped opening portions 414 opening in the Y axis direction and disposed in a spaced apart manner from each other in the X axis direction. In the opening portion 414, inlets or outlets of the flow passages (a plurality of flow passages) formed between the energy storage devices 2 of the main part 1 are positioned.

With respect to the energy storage apparatus PE according to this embodiment, it is assumed that the energy storage apparatus PE takes, as an installation state, a posture where the safety valves 25 of the energy storage devices 2 are disposed on an upper side, a posture where the safety valves 25 of the energy storage devices 2 are directed in a horizontal direction, or a posture between the above-mentioned two postures.

With such a configuration, in the posture where the safety valves 25 of the energy storage devices 2 are disposed on an upper side, the end surfaces ESa of the other beam portion 410a are directed in an upward direction. In the posture where the safety valves 25 of the energy storage devices 2 are directed in a horizontal direction, the end surfaces of ESb of the first connecting portions 410b, the end surfaces ESc of the second connecting portions 410c, and the end surfaces ESd of the third connecting portion 410d are directed in an upward direction. In the posture between the posture where the safety valves 25 of the energy storage devices 2 are disposed on an upper side and the posture where the safety valves 25 of the energy storage devices 2 are directed in a horizontal direction, the connecting portions (arcuate surfaces) between the end surfaces ESb of the first connecting portions 410b, the end surfaces ESc of the second connecting portions 410c and the end surfaces ESd of the third connecting portion 410d with the end surfaces ESa of the other beam portion 410a, and at least one of the end surfaces ESa, ESb, ESd which form the connecting portions is directed in an upward direction. In this specification, "directed in an upward direction" includes not only a state where the surfaces are directed upright in the vertical direction but also a state where the surfaces are directed in an obliquely upward direction.

The first extending portion 411 extends along the first end surfaces 21A of the respective energy storage devices 2 from the body portion 410 (to be more specific, one beam portion 410a). The first extending portion 411 of this embodiment extends in the Y axis direction from an end portion of the body portion 410 on a first end surface 21A side of the energy storage device 2 included in the main part 1.

The second extending portion 412 extends along the second end surfaces 21B of the respective energy storage devices 2 from the body portion 410 (to be more specific, the other beam portion 410a). The second extending portion 412 of this embodiment extends in the Y axis direction from an end portion of the body portion 410 on a second end surface 21B side of the energy storage devices 2. A size of the second extending portion 412 in the Y axis direction is larger than a size of the first extending portion 411 in the same direction.

The terminal extending portions 413 extend along the terminal member 40 from the body portion 410 (to be more specific, first connecting portions 410b). In this embodiment, the terminal extending portions 413 extend in the Y axis direction from end portions of the body portion 410 in the X axis direction. The terminal extending portions 413 are portions of the connecting member 41 fixed to the terminal member 40. In this embodiment, as shown in FIG. 2, the terminal extending portions 413 of this embodiment are fastened to the terminal members 40 using screws B.

The insulators 5 have an insulation property. In this embodiment, the insulators 5 are formed of a resin-made molded product respectively. The insulator 5 is disposed between the main part 1 (energy storage devices 2 and the neighboring members 3) and the connecting member 41. The insulator 5 covers at least a surface of the connecting member 41 (body portion 410) which is directed toward the main part 1 (energy storage devices 2) side. With such a configuration, the insulators 5 provide insulation between the energy storage devices 2 of the main part 1 and the holders 4.

Figure 11:
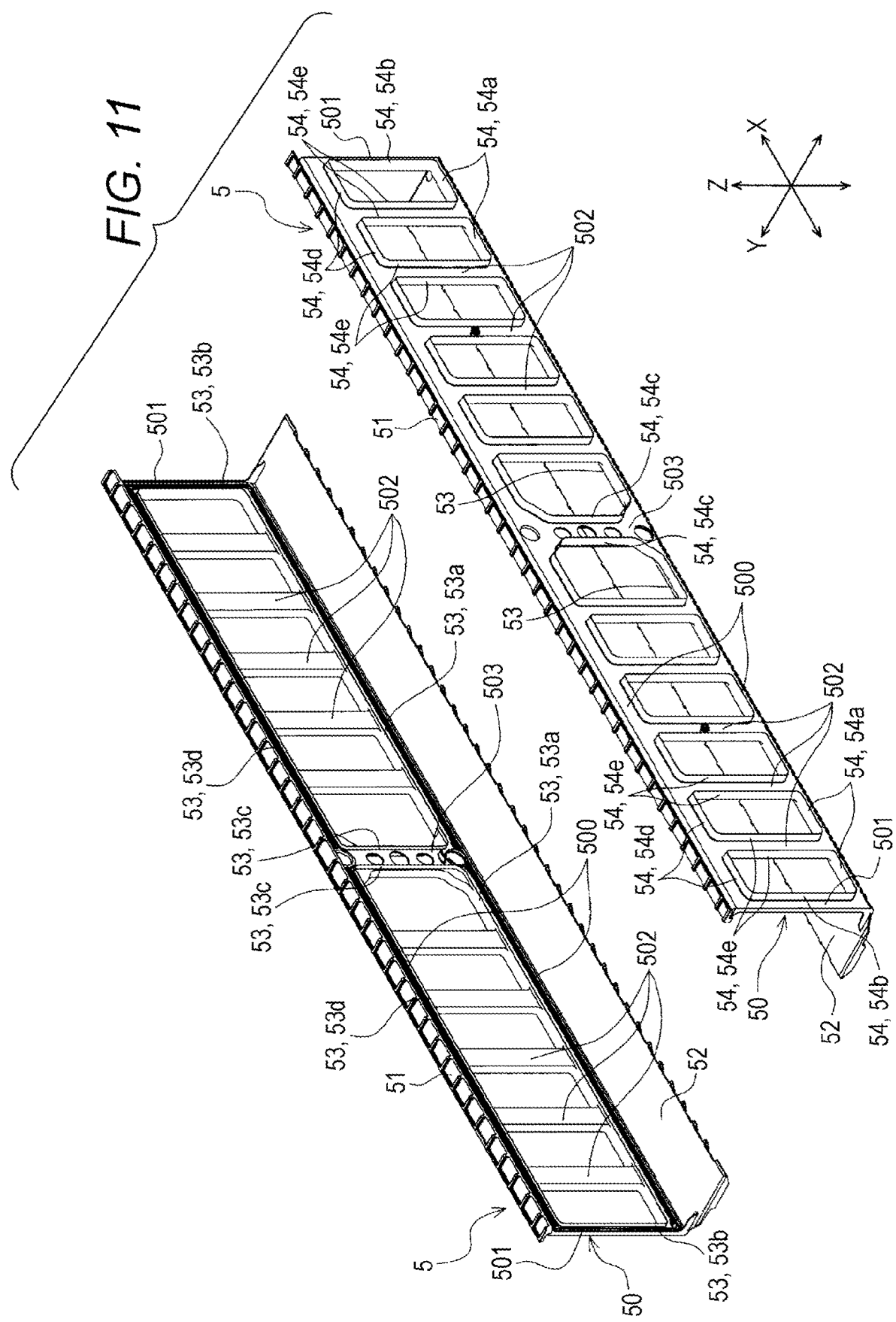
FIG. 11 is a perspective view of a pair of insulators which the energy storage apparatus includes.

To be more specific, as shown in FIG. 11, the insulator 5 has: a body covering portion 50 which covers the body portion 410, a first covering portion 51 which covers the first extending portion 411; a second covering portion 52 which covers the second extending portion 412; and a seal portion 53 which extends toward a main part 1 side from the body covering portion 50. In this embodiment, the insulator 5 further has ribs 54 which extend toward a side opposite to a main part 1 side from the body covering portion 50.

The body covering portion 50 covers a surface of the body portion 410 which is directed toward the main part 1 side. Corresponding to such a configuration, the body covering portion 50 has a shape corresponding to the body portion 410.

To be more specific, the body covering portion 50 has: a pair of covering portions (hereinafter referred to as beam covering portion) 500 which covers surfaces of the beam portions 410a directed toward a main part 1 side; a pair of covering portions (hereinafter referred to as first connection covering portions) 501 which covers surfaces of the first connecting portions 410b directed toward a main part 1 side; a plurality of covering portions (hereinafter referred to as second connection covering portions) 502 which cover surfaces of the second connecting portions 410c directed toward a main part 1 side; and a covering portion (hereinafter referred to as a third connection covering portion) 503 which covers a surface of the third connecting portion 410d directed toward a main part 1 side.

Figure 12:
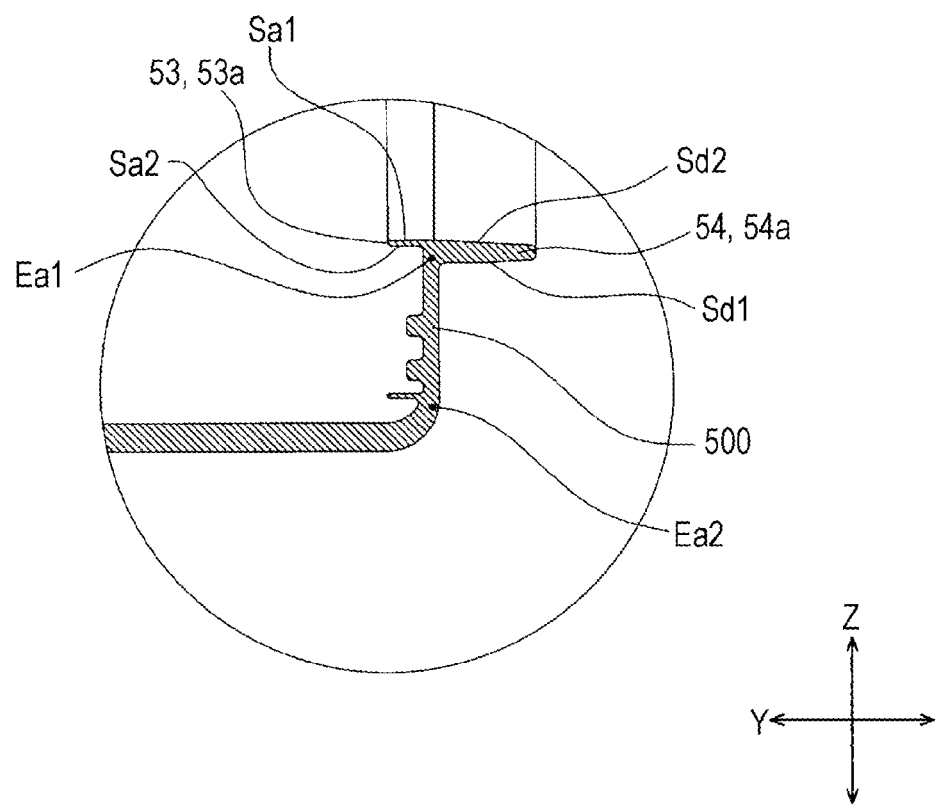
FIG. 12 is a partially enlarged cross-sectional view of the insulator which the energy storage apparatus includes.

As shown in FIG. 2, the pair of beam covering portions 500 extends in the X axis direction, and is disposed in a spaced apart manner from each other in the Z axis direction. Out of the pair of beam covering portions 500, one beam covering portion 500 covers a surface of one beam portion 410a directed toward a main part 1 side. On the other hand, out of the pair of beam covering portions 500, the other beam covering portion 500 covers a surface of the other beam portion 410a directed toward a main part 1 side. As shown in FIG. 12, the other beam covering portion 500 has: a first end portion Ea1; and a second end portion Ea2 disposed on a side opposite to the first end portion Ea1 in the Z axis direction.

That is, the other beam covering portion 500 has the first end portion Ea1 and the second end portion Ea2 in a direction (Z axis direction) orthogonal to the end surface of the other beam portion 410a. The first end portion Ea1 and the second end portion Ea2 of the other beam covering portion 500 respectively extend straightly in the X axis direction. In the other beam covering portion 500, the first end portion Ea1 is made to slightly project from the end surface ESa of the other beam portion 410a in a state where the other beam covering portion 500 covers a surface of the other beam portion 410a directed toward a main part 1 side.

Although not shown in the drawing, in this embodiment, one beam covering portion 500 also has a first end portion and a second end portion disposed on a side opposite to the first end portion in the Z axis direction, and in a state where one beam covering portion 500 covers a surface of one beam portion 410a directed toward a main part 1 side, the first end portion Ea1 is made to slightly project from the end surface (end surface opposedly facing the other beam portion 410a) ESa of one beam portion 410a in the Z axis direction.

Figure 13:
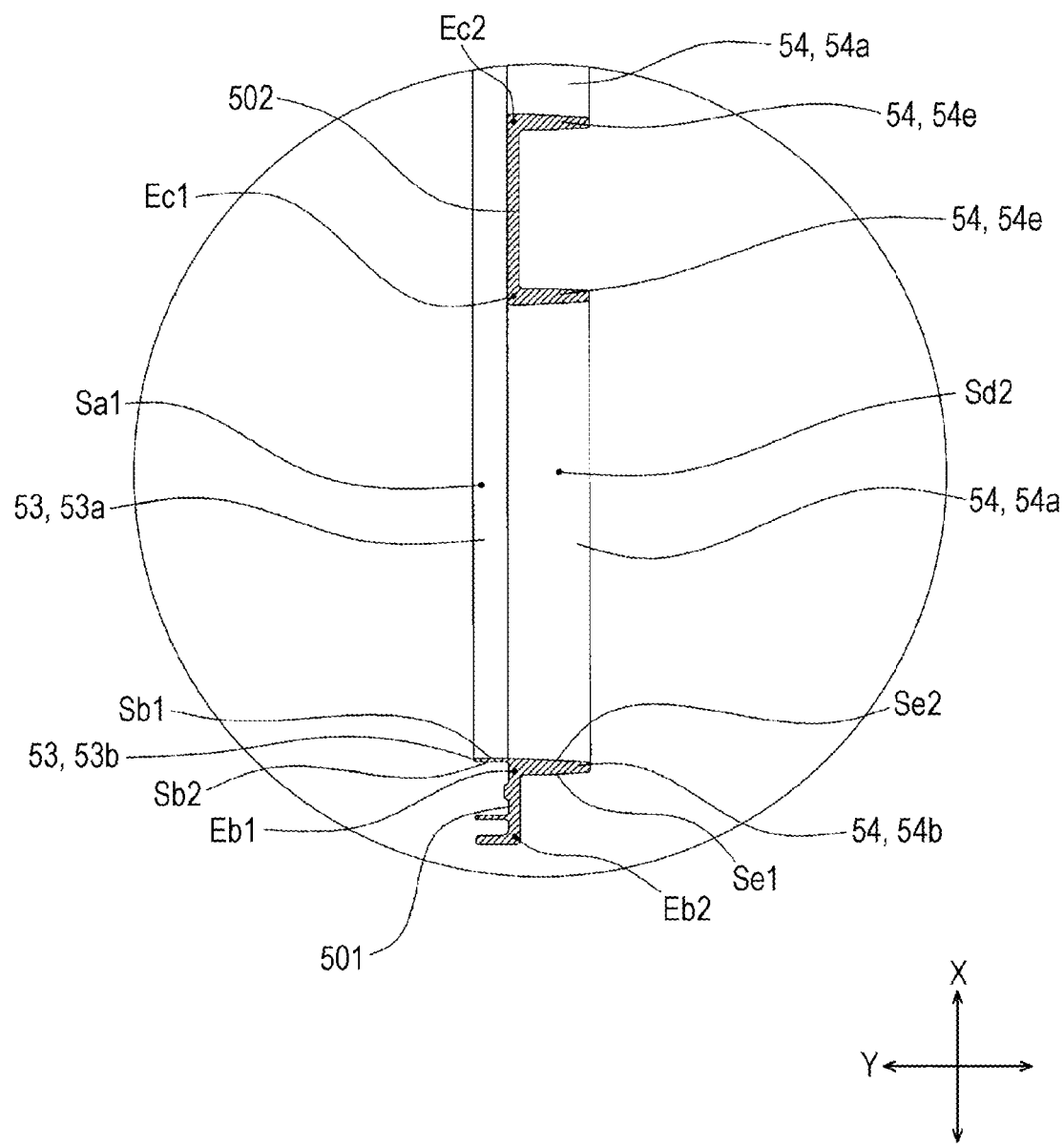
FIG. 13 is a partially enlarged cross-sectional view of the insulator which the energy storage apparatus includes.

As shown in FIG. 2, the first connection covering portions 501 extend in the Z axis direction. The first connection covering portions 501 cover surfaces of the first connecting portions 410b directed toward a main part 1 side. As shown in FIG. 13, the first connection covering portion 501 has a first end portion Eb1 and a second end portion Eb2 disposed on a side opposite to the first end portion Eb1 in the X axis direction. That is, the first connection covering portion 501 has the first end portion Eb1 and the second end portion Eb2 in a direction orthogonal to the end surface ESb of the first connecting portion 410b. The first end portion Eb1 and the second end portion Eb2 of the first connection covering portion 501 respectively extend straightly in the Z axis direction. In the first connection covering portion 501, the first end portion Eb1 is made to slightly project from the end surface ESb of the first connecting portion 410b in the X axis direction in a state where the first connection covering portion 501 covers a surface of the first connecting portion 410b directed toward a main part 1 side.

As shown in FIG. 2, the second connection covering portions 502 extend in the Z axis direction. The second connection covering portions 502 cover surfaces of the second connecting portions 410c directed toward a main part 1 side. As shown in FIG. 13, the second connection covering portion 502 has a first end portion Ec1 and a second end portion Ec2 disposed on a side opposite to the first end portion Ec1 in the X axis direction. That is, the second connection covering portion 502 has the first end portion Ec1 and the second end portion Ec2 in a direction orthogonal to the end surface ESc of the second connecting portion 410c. The first end portion Ec1 and the second end portion Ec2 of the second connection covering portion 502 respectively extend straightly in the Z axis direction. In the second connection covering portion 502, the first end portion Ec1 is made to slightly project from the end surface ESc of the second connecting portion 410c in the X axis direction in a state where the second connection covering portion 502 covers a surface of the second connecting portion 410c directed toward a main part 1 side.

As shown in FIG. 2, the third connection covering portion 503 covers a surface of the third connecting portion 410d directed toward a main part 1 side. That is, the third connection covering portion 503 is disposed at a position which overlaps with the first neighboring member 31 in the Y axis direction. To be more specific, the third connection covering portion 503 extends in the Z direction, and connects the center portions of the pair of beam covering portions 500 in the longitudinal direction. That is, the third connection covering portion 503 is disposed such that a center line of the third connection covering portion 503 extending in the Z axis direction agrees with or substantially agrees with a center line of the first body portion 310 (third surface 310C) of the first neighboring member 31 extending in the Z axis direction as viewed in a Y axis direction. Based on the above-mentioned configuration, a width of the third connection covering portion 503 in the X axis direction is set smaller than a thickness (a size in the X axis direction) of the first body portion 310 of the first neighboring member 31. That is, the third connection covering portion 503 is disposed so as to avoid regions where inlets and outlets of the flow passages for a fluid formed by the first neighboring member 31 are formed.

Figure 14:
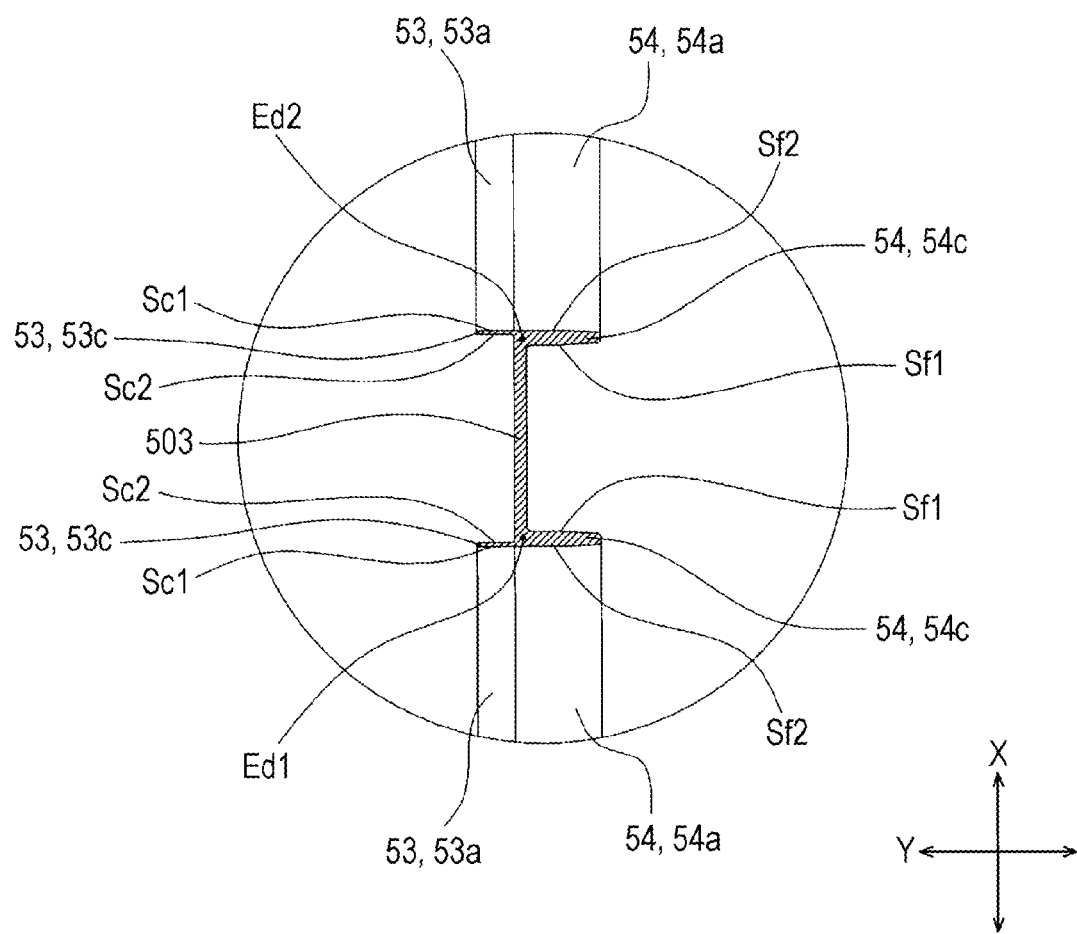
FIG. 14 is a partially enlarged cross-sectional view of the insulator which the energy storage apparatus includes.

As shown in FIG. 14, the third connection covering portion 503 includes a first end portion Ed1 and a second end portion Ed2 on a side opposite to the first end portion Ed1 in the X axis direction. That is, the third connection covering portion 503 has the first end portion Ed1 and the second end portion Ed2 in a direction orthogonal to the end surface ESd of the third connecting portion 410d. The first end portion Ed1 and the second end portion Ed2 of the third connection covering portion 503 respectively extend straightly in the Z axis direction. In the third connection covering portion 503, in a state where the third connection covering portion 503 covers the third connecting portion 410d, the first end portion Ed1 is made to slightly project from one end surface ESd out of the end surfaces ESd, ESd disposed on both ends of the third connecting portions 410d in the X axis direction, and the second end portion Ed2 is made to slightly project from the other end surface ESd out of the end surfaces ESd, ESd disposed on both ends of the third connecting portion 410d in the X axis direction.

As shown in FIG. 2 and FIG. 4, the first covering portion 51 covers at least a surface of the first extending portion 411 directed toward an energy storage device 2 side. The first covering portion 51 of this embodiment covers the surface of the first extending portion 411 directed toward the energy storage device 2 (first end surface 21A) side, and a surface of the first extending portion 411 directed toward a side opposite to an energy storage device 2 side.

The second covering portion 52 extends to a distal end (distal end in the Y axis direction) of the second extending portion 412 from a boundary position between the second extending portion 412 and the body portion 410 along a surface 412A of the second extending portion 412 which is directed toward an energy storage device 2 (second end surface 21B) side, is folded back at the distal end of second extending portion 412, and extends along a surface (outer surface) 412B of the second extending portion 412 on a side opposite to the energy storage device 2. With such a configuration, the second covering portion 52 embraces the second extending portion 412 thus covering both surfaces 412A, 412B of the second extending portion 412. That is, a distal end portion (distal end portion in the Y axis direction) of the second covering portion 52 forms a bag shape so as to allow the insertion of the distal end portion of the second extending portion 412 into the second covering portion 52.

Returning to FIG. 11, in this embodiment, the seal portion 53 of the insulator 5 is formed into an endless annular shape as viewed in the Y axis direction. That is, the seal portion 53 is formed into an endless annular shape so as to surround the flow passages (the plurality of flow passages) for a fluid which are formed by the plurality of second neighboring members 32 respectively. In this embodiment, as shown in FIG. 11 and FIG. 12, the seal portion 53 of the insulator 5 includes a seal portion (hereinafter referred to as a first seal portion) 53a which extends toward a main part 1 side from the first end portion Ea1 of the other beam covering portion 500. As shown in FIG. 11 and FIG. 13, the seal portion 53 of the insulator 5 includes a seal portion (hereinafter referred to as a second seal portion) 53b which extends toward a main part 1 side from the first end portion Eb1 of the first connection covering portion 501. As shown in FIG. 11 and FIG. 14, the insulator 5 includes seal portions (hereinafter referred to as third seal portions) 53c which extend toward a main part 1 side from the first end portion Ed1 and the second end portion Ed2 of the third connection covering portion 503 respectively. Further, in this embodiment, as shown in FIG. 11, the seal portion 53 of the insulator 5 includes a seal portion (hereinafter referred to as a fourth seal portion) 53d which extends from the first end portion of one beam covering portion 500 on a main part 1 side.

In this embodiment, the energy storage apparatus PE includes the first neighboring member 31 fixed to the holder 4 and hence, as shown in FIG. 3, the main part 1 is partitioned into two blocks B1, B2 with the first neighboring member 31 as a boundary. With such a configuration, the insulator 5 includes two first seal portions 53a, two second seal portions 53b, two third seal portions 53c, and two fourth seal portions 53d corresponding to the respective blocks B1, B2.

As shown in FIG. 12, in the respective blocks B1, B2, the first seal portion 53a has a thickness in the Z axis direction. With such a configuration, the first seal portion 53a has a first surface Sa1 and a second surface Sat on a side opposite to the first surface Sa1 in the Z axis direction. In the first seal portion 53a, the second surface Sat is directed toward a second end portion Ea2 side of the other beam covering portion 500.

In the respective blocks B1, B2, the first seal portion 53a extends in the X axis direction. In this embodiment, the first seal portion 53a extends from the first end portion Eb1 of either one of the first connection covering portions 501 to the first end portion Ed1 or the second end portion Ed2 of the third connection covering portion 503 (see FIG. 11). A projection amount of the first seal portion 53a from the other beam covering portion 500 in the Y axis direction is set to a projection amount which allows the first seal portion 53a to be in contact with the main part 1. In this embodiment, a projection amount of the first seal portion 53a from the other beam covering portion 500 in the Y axis direction is set to a projection amount which allows the first seal portion 53a to be in contact with the second restricting portion 321 of the second neighboring member 32. In this embodiment, the first seal portion 53a is elastically deformable.

In the respective blocks B1, B2, as shown in FIG. 13, the second seal portion 53b has a thickness in the X axis direction. With such a configuration, the second seal portion 53b has a first surface Sb1 and a second surface Sb2 on a side opposite to the first surface Sb1 in the X axis direction. In the second seal portion 53b, the second surface Sb2 is directed toward a second end portion Eb2 side of the first connection covering portion 501. The second seal portion 53b extends in the Z axis direction (see FIG. 11). A projection amount of the second seal portion 53b from the first connection covering portion 501 in the Y axis direction is set to a projection amount which allows the second seal portion 53b to be in contact with the main part 1. In this embodiment, a projection amount of the second seal portion 53b from the first connection covering portion 501 in the Y axis direction is set to a projection amount which allows the second seal portion 53b to be in contact with the outer surface of the third body portion 330 of the third neighboring member 33 in the Y axis direction. In this embodiment, the second seal portion 53b is elastically deformable.

In the respective blocks B1, B2, the second seal portion 53b is connected to one end portion of the first seal portion 53a in a longitudinal direction of the first seal portion 53a. In this embodiment, a connecting portion between the first seal portion 53a and the second seal portion 53b is curved in an arcuate shape as viewed in the Y axis direction (see FIG. 11).

In the respective blocks B1, B2, as shown in FIG. 14, the third seal portion 53c has a thickness in the X axis direction. With such a configuration, the third seal portion 53c has a first surface Sc1 and a second surface Sc2 on a side opposite to the first surface Sc1 in the X axis direction. In the third seal portion 53c, the second surface Sc2 is directed toward an end portion (first end portion Ed1 or the second end portion Ed2) side on a side opposite to the first end portion Ed1 or the second end portion Ed2 to which the third seal portion 53c is connected. That is, the second surface Sc2 of the third seal portion 53c which extends from the first end portion Ed1 of the third connection covering portion 503 and the second surface Sc2 of the third seal portion 53c which extends from the second end portion Ed2 of the third connection covering portion 503 are made to oppositely face each other.

In the respective blocks B1, B2, the third seal portion 53c extends in the Z axis direction (see FIG. 11). A projection amount of the third seal portion 53c from the third connection covering portion 503 in the Y axis direction is set to a projection amount which allows the third seal portion 53c to be in contact with the main part 1. In this embodiment, a projection amount of the third seal portion 53c from the third connection covering portion 503 in the Y axis direction is set to a projection amount which allows the third seal portion 53c to be in contact with the outer surface of the first body portion 310 of the first neighboring member 31 in the Y axis direction. In this embodiment, the third seal portion 53c is elastically deformable.

In the respective blocks B1, B2, the third seal portion 53c is connected to the other end portion of the first seal portion 53a in a longitudinal direction of the first seal portion 53a. In this embodiment, a connecting portion between the first seal portion 53a and the third seal portion 53c is curved in an arcuate shape as viewed in the Y axis direction (see FIG. 11).

Returning to FIG. 9, in the respective blocks B1, B2, the fourth seal portion 53d has a thickness in the Z axis direction. With such a configuration, the fourth seal portion 53d has a first surface (not indicated by a symbol) and a second surface (not indicated by a symbol) on a side opposite to the first surface in the Z axis direction. In the respective blocks B1, B2, the fourth seal portion 53d oppositely faces the first seal portion 53a in a spaced apart manner in the Z axis direction. That is, the fourth seal portion 53d extends from the first end portion Eb1 of either one of the first connection covering portions 501 to the first end portion Ed1 or the second end portion Ed2 of the third connection covering portion 503. In this embodiment, in the respective blocks B1, B2, the fourth seal portion 53d is brought into contact with the second restricting portions 321 of the second neighboring members 32 of the main part 1.

One end portion of the fourth seal portion 53d in the longitudinal direction is connected to the second seal portion 53b, and the other end portion of the fourth seal portion 53d in the longitudinal direction is connected to the third seal portion 53c. The respective connecting portions are curved in an arcuate shape as viewed in the Y axis direction (see FIG. 11).

In this manner, the seal portion 53 is formed into an annular shape by connecting the first seal portion 53a, the second seal portion 53b, the third seal portion 53c, and the fourth seal portion 53d thus surrounding the plurality of flow passages (flow passages between the energy storage devices 2) formed in the main part 1.

As shown in FIG. 11 and FIG. 12, the ribs 54 of the insulator 5 include ribs (hereinafter referred to as first ribs 54a) which extend from the first end portion Ea1 of the other beam covering portion 500 toward a side opposite to a main part 1 side. In this embodiment, as shown in FIG. 11 and FIG. 13, the ribs 54 of the insulator 5 include ribs (hereinafter referred to as second ribs) 54b which extend from the first end portion Eb1 of the first connection covering portion 501 toward a side opposite to a main part 1 side. In this embodiment, as shown in FIG. 11 and FIG. 14, the ribs 54 of the insulator 5 include ribs (hereinafter referred to as third ribs) 54c which extend from the end portions (first end portion Ed1 and second end portion Ed2) of the third connection covering portion 503 toward a side opposite to a main part 1 side. In this embodiment, as shown in FIG. 11, the ribs 54 of the insulator 5 include ribs (hereinafter referred to as fourth ribs) 54d which extend from the end portion (first end portion) of one beam covering portion 500 toward a side opposite to a main part 1 side, and ribs (hereinafter referred to as fifth ribs) 54e which extend from the end portions (first end portion Ec1 and second end portion Ec2) of the second connection covering portion 502 toward a side opposite to a main part 1 side (see FIG. 13).

As shown in FIG. 11, the plurality of first ribs 54a are disposed in a spaced apart manner in the X axis direction. In this embodiment, as described above, the main part 1 is partitioned into two blocks B1, B2 in the X axis direction. With such a configuration, the plurality of first ribs 54a are disposed in a spaced apart manner in the X axis direction in the respective blocks B1, B2. To be more specific, the first ribs 54a are disposed such that the first rib 54a corresponds to a position between the first connecting portion 410b and the second connecting portion 410c disposed adjacently to each other in the X axis direction, the first rib 54a corresponds to a position between the second connecting portions 410c, 410c disposed adjacently to each other in the X axis direction, and the first rib 54a corresponds to a position between the second connecting portion 410c and the third connecting portion 410d disposed adjacently to each other in the X axis direction.

As shown in FIG. 12, the first rib 54a has a proximal end connected to the other beam covering portion 500, and a distal end on a side opposite to the proximal end in the Y axis direction. A length of the first rib 54a is set such that the distal end of the first rib 54a extends to the outside of the other beam portion 410a in the Y axis direction. The first rib 54a has a first surface Sd1 which oppositely faces the end surface ESa of the other beam portion 410a and a second surface Sd2 disposed on a side opposite to the first surface Sd1 in the Z axis direction (in a direction orthogonal to the end surface ESa of the other beam portion 410a). The second surface Sd2 of the first rib 54a is continuously formed with the first surface Sa1 of the first seal portion 53a. In this embodiment, the second surfaces Sd2 of the plurality of first ribs 54a are inclined downwardly from the proximal end toward the distal end.

In the respective blocks B1, B2, the second ribs 54b are formed corresponding to the first connecting portions 410b. As shown in FIG. 13, the second rib 54b has a proximal end connected to the first connection covering portion 501, and a distal end disposed on a side opposite to the proximal end in the Y axis direction. A length of the second rib 54b is set such that the distal end of the second rib 54b extends to the outside of the first connecting portion 410b in the Y axis direction. The second rib 54b has a first surface Se1 which oppositely faces the end surface ESb of the first connecting portion 410b and a second surface Se2 disposed on a side opposite to the first surface Se1 in the X axis direction. The second surface Se2 of the second rib 54b is continuously formed with the first surface Sb1 of the second seal portion 53b. In this embodiment, the second surfaces Se2 of the second ribs 54b are inclined downwardly from the proximal end toward the distal end.

The second rib 54b is connected to the first rib 54a disposed between the first connecting portion 410b and the second connecting portion 410c. A connecting portion between the first rib 54*a* and the second rib 54*b* is curved in an arcuate shape as viewed in the Y axis direction (see FIG. 11).

In the respective blocks B1, B2, the third ribs 54*c* are formed corresponding to the third connecting portions 410*d*. To describe the configuration specifically, as shown in FIG. 14, the third rib 54*c* has a proximal end connected to the third connection covering portion 503, and a distal end disposed on a side opposite to the proximal end in the Y axis direction. A length of the third rib 54*c* is set such that a distal end of the third rib 54*c* extends to the outside of the third connecting portion 410*d* in the Y axis direction.

The third rib 54*c* has a first surface Sf1 which opposedly faces the end surface ESd of the third connecting portion 410*d* and a second surface Sf2 disposed on a side opposite to the first surface Sf1 in the X axis direction. The second surface Sf2 of the third rib 54*c* is continuously formed with the first surface Sc1 of the third seal portion 53*c*. In this embodiment, the second surfaces Sf2 of the third ribs 54*c* are inclined downwardly from a proximal end toward a distal end.

The third rib 54*c* is connected to the first rib 54*a* disposed between the second connecting portion 410*c* and the third connecting portion 410*d*. A connecting portion between the first rib 54*a* and the third rib 54*c* is curved in an arcuate shape as viewed in the Y axis direction (see FIG. 11).

As shown in FIG. 11, the plurality of fourth ribs 54*d* are disposed in a spaced apart manner in the X axis direction. In this embodiment, as described above, the main part 1 is partitioned into two blocks B1, B2 in the X axis direction. With such a configuration, the plurality of fourth ribs 54*d* are disposed in a spaced apart manner in the X axis direction in the respective blocks B1, B2. To be more specific, the fourth ribs 54*d* are disposed such that the fourth rib 54*d* corresponds to a position between the first connecting portion 410*b* and the second connecting portion 410*c* disposed adjacently to each other in the X axis direction, the fourth rib 54*d* corresponds to a position between the second connecting portions 410*c*, 410*c* disposed adjacently to each other in the X axis direction, and the fourth rib 54*d* corresponds to a position between the second connecting portion 410*c* and the third connecting portion 410*d* disposed adjacently to each other in the X axis direction.

Such a configuration is described in detail. Each of the plurality of fourth ribs 54*d* has a proximal end which is connected to one beam covering portion 500 and a distal end on a side opposite to the proximal end in the Y axis direction. A length of each of the plurality of fourth ribs 54*d* is set to a length such that the distal end of the fourth rib 54*d* extends to the outside of one beam portion 410*a* in the Y axis direction. The fourth rib 54*d* disposed between the second connecting portion 410*c* and the third connecting portion 410*d* is connected to the third rib 54*c*. A connecting portion between the first rib 54*a* and the third rib 54*c* is curved in an arcuate shape as viewed in the Y axis direction.

In the respective blocks B1, B2, the fifth ribs 54*e* are formed corresponding to the second connecting portions 410*c*. To describe the configuration specifically, as shown in FIG. 11 and FIG. 13, the fifth rib 54*e* has a proximal end connected to the second connection covering portion 502, and a distal end disposed on a side opposite to the proximal end in the Y axis direction. The second connection covering portion 502 has both ends (first end portion Ec1, second end portion Ec2) in the X axis direction and hence, the fifth rib 54*e* is formed corresponding to both end portions (first end portion Ec1, second end portion Ec2) of the second connection covering portion 502 respectively.

A length of the fifth rib 54*e* is set such that a distal end of the fifth rib 54*e* extends to the outside of the second connecting portion 410*c*. The fifth rib 54*e* is connected to the first rib 54*a* and the fourth rib 54*d*. A connecting portion between the first rib 54*a* and the fourth rib 54*d* with the fifth rib 54*e* is curved in an arcuate shape as viewed in the Y axis direction (see FIG. 11).

In this manner, the fifth ribs 54*e* are formed corresponding to the end portions of the second connection covering portion 502 in the X axis direction and are also connected to the first ribs 54*a* and the fourth ribs 54*d* respectively and hence, the rib 54 has an annular shape as viewed in the Y axis direction. The annular rib 54 (first rib 54*a*, second rib 54*b*, third rib 54*c*, fourth rib 54*d*) extends to the outside of the connecting member 41 while passing through the opening portion 414 of the corresponding connecting member 41.

As shown in FIG. 1, FIG. 2, and FIG. 4, the bus bar 6 is a plate-like member having conductivity made of metal or the like. The bus bar 6 makes the external terminals 20 of the different energy storage devices 2 conductive with each other. In the energy storage apparatus PE, the plurality of bus bars 6 are provided (the number of bus bars 6 corresponding to the number of the plurality of energy storage devices 2). In this embodiment, the plurality of bus bars 6 connect all of the plurality of energy storage devices 2 included in the energy storage apparatus PE in series (making the energy storage devices 2 conductive with each other).

The energy storage apparatus PE of this embodiment has the above-mentioned configuration. In the respective blocks B1, B2 of the main part 1, the first restricting portions 311 of the first neighboring member 31, the second restricting portions 321 of the plurality of second neighboring members 32, and the third restricting portions 331 of the third neighboring members 33 are formed continuously in the X axis direction. With such a configuration, the outer surfaces of the first lugs 311*a*, 321*a*, 331*a* of the respective first restricting portions 311, second restricting portions 321 and third restricting portions 331 are formed into a continuous surface respectively.

Figure 15:
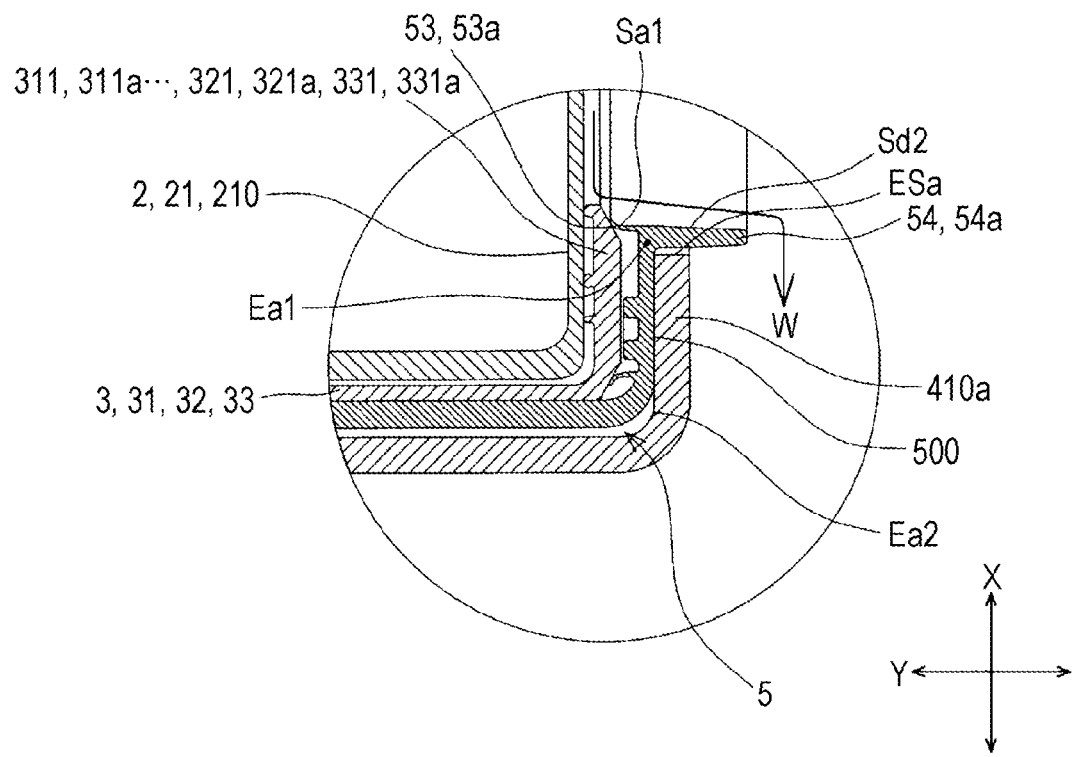
FIG. 15 is an enlarged view of an XV portion in FIG. 4.

With such a configuration, as shown in FIG. 15, the first seal portion 53*a* of the insulator 5 is brought into contact with the outer surfaces of the first lugs 311*a*, 321*a*, 331*a* which are continuously formed with each other in the X axis direction. In this embodiment, the first seal portion 53*a* is brought into contact with the tapered surfaces included in the outer surfaces of the first lugs 311*a*, 321*a*, 331*a*. As described above, the first seal portion 53*a* is elastically deformable and hence, the first seal portion 53*a* is deformed in a curved shape in a state where the first seal portion 53*a* is brought into contact with the tapered surfaces of the first lugs 311*a*, 321*a*, 331*a* thus ensuring close-contact property between the insulator 5 and the main part 1 (the first restricting portions 311 of the first neighboring member 31, the second restricting portions 321 of the second neighboring members 32, and the third restricting portions 331 of the third neighboring members 33).

Accordingly, when the energy storage apparatus PE is installed in a state where the safety valves 25 of the energy storage devices 2 are disposed on an upper side, a water droplet W which moves along the main part 1 (the case 21 of the energy storage device 2) is received by the first seal portion 53*a*. In this embodiment, the first seal portion 53*a* is connected to the first end portion Ea1 of the beam covering portion 500 which slightly projects more than the end surface ESa of the beam portion 410*a* and hence, a water droplet W received by the first seal portion 53*a* flows through the first seal portion 53a without being pooled between the beam portion 410a and the main part 1.

In this embodiment, the first rib 54a extends from the beam portion 410a to the outside, and the second surface Sd2 of the first rib 54a is continuously formed with the first surface Sa1 of the first seal portion 53a and hence, a water droplet W received by the first seal portion 53a is discharged to the outside. Particularly, in this embodiment, the second surface Sd2 of the first rib 54a is inclined downwardly toward a distal end thereof and hence, the water droplet W is guided to the outside by the inclination of the second surface Sd2.

Figure 16:
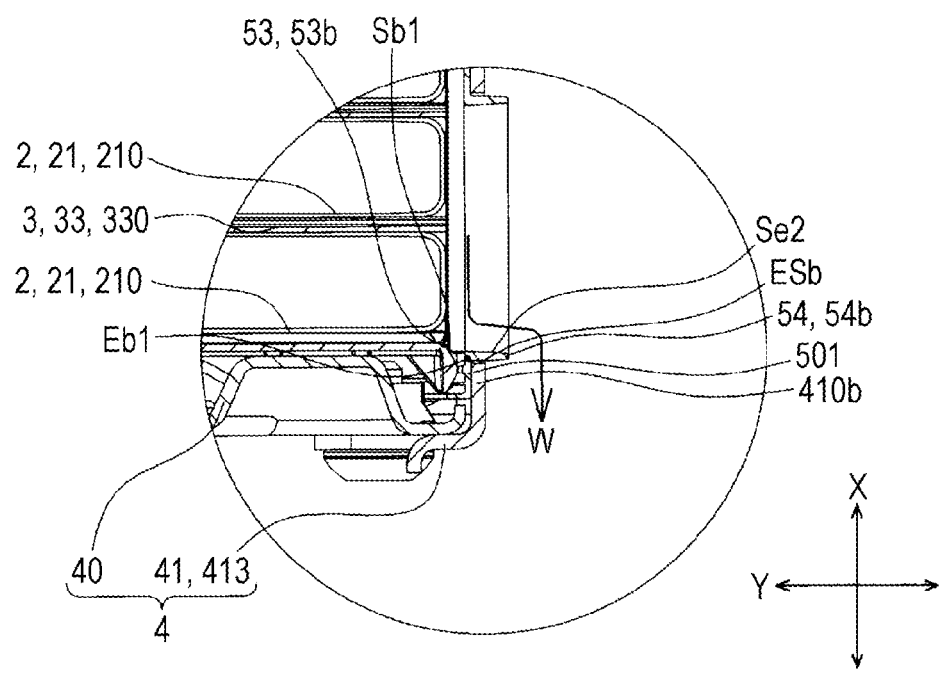
FIG. 16 is an enlarged view of an XVI portion in FIG. 3.

In the respective blocks B1, B2 of the main part 1, as shown in FIG. 16, the second seal portion 53b of the insulator 5 is brought into contact with the outer surface of the third body portion 330 of the third neighboring member 33 directed in the Y axis direction. In this embodiment, the second seal portion 53b is brought into contact with the tapered surface included in the outer surface of the third body portion 330 directed in the Y axis direction. As described above, the second seal portion 53b is elastically deformable and hence, the second seal portion 53b is deformed in a curved shape in a state where the second seal portion 53b is brought into contact with the tapered surface included in the outer surface of the third body portion 330 thus ensuring close-contact property between the second seal portion 53b and the main part 1 (the third body portion 330 of the third neighboring members 33).

In the respective blocks B1, B2 of the main part 1, as shown in FIG. 16, the third seal portion 53c of the insulator 5 is brought into contact with the outer surface (the third surface 310C) of the first body portion 310 of the first neighboring member 31 directed in the Y axis direction. In this embodiment, the second seal portion 53b is brought into contact with the tapered surface included in the outer surface (the third surface 310C) of the first body portion 310 directed in the Y axis direction. As described above, the third seal portion 53c is elastically deformable and hence, the third seal portion 53c is deformed in a curved shape in a state where the third seal portion 53c is brought into contact with the tapered surface included in the outer surface (the third surface 310C) of the first body portion 310 thus ensuring close-contact property between the third seal portion 53c and the main part 1 (the first body portion 310 of the first neighboring members 31).

Figure 17:
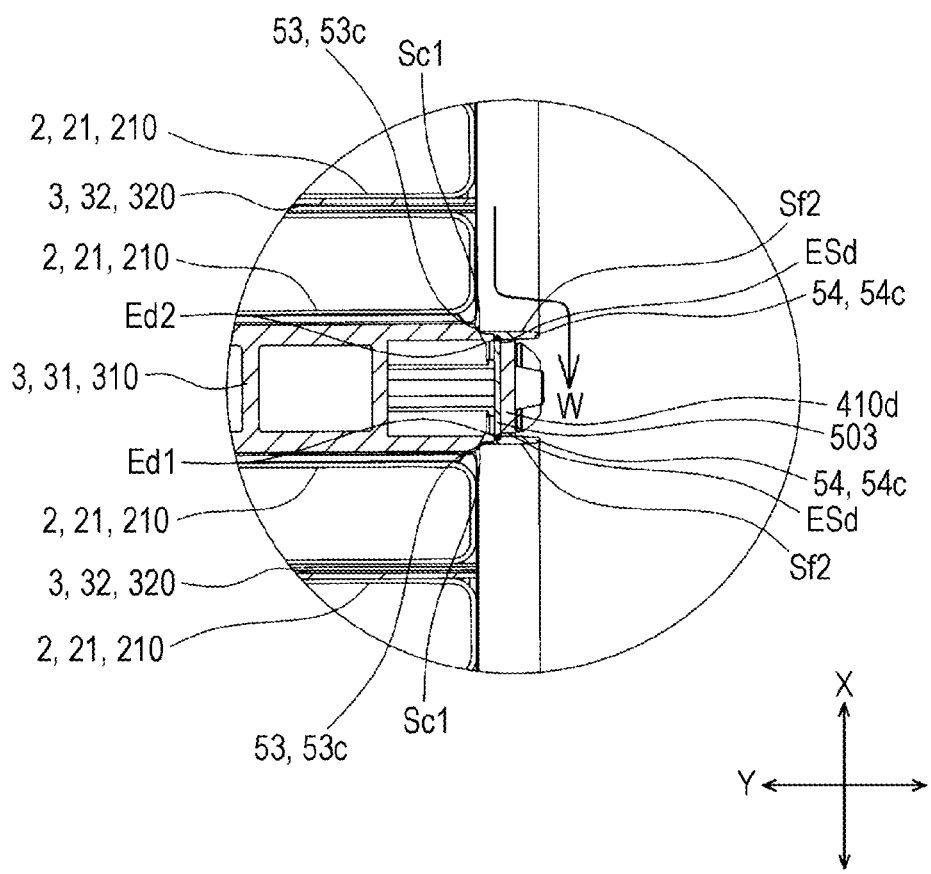
FIG. 17 is an enlarged view of an XVII portion in FIG. 3.

Accordingly, when the energy storage apparatus PE is installed in a state where the safety valves 25 of the energy storage devices 2 are disposed horizontally, as shown in FIG. 16 and FIG. 17, a water droplet W which moves along the main part 1 (the case 21 of the energy storage device 2) is received by the second seal portion 53b and the third seal portion 53c respectively.

The second seal portion 53b is connected to the first end portion Eb1 of the first connection covering portion 501 which slightly projects more than the end surface ESb of the first connecting portion 410b and hence, a water droplet W received by the second seal portion 53b flows through the second seal portion 53b without being pooled between the first connecting portion 410b and the main part 1.

In this embodiment, the second rib 54b extends from the first connecting portion 410b to the outside, and the second surface Se2 of the second rib 54b is continuously formed with the first surface Sb1 of the second seal portion 53b and hence, a water droplet W received by the second seal portion 53b is discharged to the outside. Particularly, in this embodiment, the second surface Se2 of the second rib 54b is inclined downwardly toward a distal end thereof and hence, the water droplet W is guided toward the outside by the inclination of the second surface Se2.

The third seal portion 53c is connected to the end portion (the first end portion Ed1 or the second end portion Ed2) of the third connection covering portion 503 which slightly projects more than the end surface ESd of the third connecting member 410d and hence, a water droplet W received by the third seal portion 53c flows through the third seal portion 53c without being pooled between the third connecting portion 410d and the main part 1.

In this embodiment, the third rib 54c extends from the third connecting portion 410d to the outside, and the second surface Sf2 of the third rib 54c is continuously formed with the first surface Sc1 of the third seal portion 53c and hence, a water droplet W received by the third seal portion 53c is discharged to the outside. Particularly, in this embodiment, the second surface Sf2 of the third rib 54c is inclined downwardly toward a distal end thereof and hence, the water droplet W is guided toward the outside by the inclination of the second surface Sf2.

As has been described heretofore, the energy storage apparatus PE of this embodiment includes: the main part 1 including the energy storage devices 2; the conductive oppositely facing member (the connecting member) 41 disposed so as to opposedly face the main part 1; and the insulating member (the insulator) 5 disposed between the main part 1 and the opposedly facing member (the connecting member) 41, wherein the oppositely facing member (the connecting member) 41 has the opposedly facing portions 410a, 410b, 410d (the other beam portion 410a, the first connecting portion 410b, the third connecting portion 410d) where at least parts of the opposedly facing portions overlap with the main part 1, the opposedly facing portions 410a, 410b, 410d (the other beam portion 410a, the first connecting portion 410b, the third connecting portion 410d) have the end surfaces ESa, ESb, ESd disposed at positions where the end surfaces ESa, ESb, ESd overlap with the main part 1, the end surfaces ESa, ESb, ESd are directed toward an upper side in a state where the energy storage apparatus is installed; the insulating member 5 (the insulator 5) includes: the covering portions 500, 501, 503 (the beam covering portion 500, the first connection covering portion 501, the third connection covering portion 503) covering at least surfaces of the opposedly facing portions 410a, 410b, 410d (the other beam portion 410a, the first connecting portion 410b, the third connecting portion 410d) directed toward a main part 1 side; and the seal portions 53a, 53b, 53c (the first seal portion 53a, the second seal portion 53b, the third seal portion 53c) extending from the covering portions 500, 501, 503 (the beam covering portion 500, the first connection covering portion 501, the third connection covering portion 503) toward the main part 1 so as to close gaps formed between the main part 1 and the covering portions 500, 501, 503 (the beam covering portion 500, the first connection covering portion 501, the third connection covering portion 503), the covering portions 500, 501, 503 (the beam covering portion 500, the first connection covering portion 501, the third connection covering portion 503) have the end portions Ea1, Eb1, Ed1, Ed2 (the first end portions Ea1, Eb1, Ed1 and the second end portion Ed2) disposed at positions outside the end surfaces ESa, ESb, ESd of the opposedly facing portions 410a, 410b, 410d (the other beam portion 410a, the first connecting portion 410b, the third connecting portion 410d) in the direction orthogonal to the end surface, and the seal portions 53a, 53b, 53c (the first seal portion 53a, the second seal portion 53b, the third seal portion 53c) extend from the end portions Ea1, Eb1, Ed1, Ed2 (the first end portions Ea1, Eb1, Ed1 and the second end portion Ed2) of the covering portions 500, 501, 503 (the beam covering portion 500, the first connection covering portion 501, the third connection covering portion 503) toward the main part 1.

With the above-mentioned configuration, the end portions Ea1, Eb1, Ed1, Ed2 (the first end portions Ea1, Eb1, Ed1 and the second end portion Ed2) of the covering portions 500, 501, 503 (the beam covering portion 500, the first connection covering portion 501, the third connection covering portion 503) and the seal portions 53a, 53b, 53c (the first seal portion 53a, the second seal portion 53b, the third seal portion 53c) agree with each other in the direction orthogonal to the direction that the covering portions 500, 501, 503 (the beam covering portion 500, the first connection covering portion 501, the third connection covering portion 503) and the opposedly facing portions 410a, 410b, 410d (the other beam portion 410a, the first connecting portion 410b, the third connecting portion 410d) are respectively arranged parallel to each other. Accordingly, a space where a water droplet is pooled (a so-called pocket) is not formed between the main part 1 including the energy storage devices 2 and the covering portions 500, 501, 503 (the beam covering portion 500, the first connection covering portion 501, the third connection covering portion 503).

Further, the end portions Ea1, Eb1, Ed1, Ed2 (the first end portions Ea1, Eb1, Ed1 and the second end portion Ed2) of the covering portions 500, 501, 503 (the beam covering portion 500, the first connection covering portion 501, the third connection covering portion 503) which cover the opposedly facing portions 410a, 410b, 410d (the other beam portion 410a, the first connecting portion 410b, the third connecting portion 410d) and from which the seal portions 53a, 53b, 53c (the first seal portion 53a, the second seal portion 53b, the third seal portion 53c) extend are disposed at the positions outside the end surfaces ESa, ESb, ESd of the opposedly facing portions 410a, 410b, 410d (the other beam portion 410a, the first connecting portion 410b, the third connecting portion 410d) in the direction orthogonal to the direction that the covering portions 500, 501, 503 (the beam covering portion 500, the first connection covering portion 501, the third connection covering portion 503) and the opposedly facing portions 410a, 410b, 410d (the other beam portion 410a, the first connecting portion 410b, the third connecting portion 410d) are arranged parallel to each other. Accordingly, a space in which a water droplet is pooled is not formed also between the opposedly facing portions 410a, 410b, 410d (the other beam portion 410a, the first connecting portion 410b, the third connecting portion 410d) and the covering portions 500, 501, 503 (the beam covering portion 500, the first connection covering portion 501, the third connection covering portion 503) respectively.

Accordingly, in a state where the energy storage apparatus PE is installed, when a water droplet W adhering to the main part 1 including the energy storage devices 2 reaches the seal portion 53a, 53b, 53c (the first seal portion 53a, the second seal portion 53b, the third seal portion 53c), the water droplet W is discharged to the outside though the seal portion 53a, 53b, 53c (the first seal portion 53a, the second seal portion 53b, the third seal portion 53c), the end portion Ea1, Eb1, Ed1, Ed2 (the first end portions Ea1, Eb1, Ed1 and the second end portion Ed2) of the covering portion 500, 501, 503 (the beam covering portion 500, the first connection covering portion 501, the third connection covering portion 503). Accordingly, the energy storage apparatus PE having the above-mentioned configuration can suppress pooling of a water droplet between the main part 1 including the energy storage devices 2 and the opposedly facing member (connecting member) 41 thus suppressing lowering of an insulating performance.

In this embodiment, the insulating member 5 (the insulator 5) includes the ribs 54 (the first ribs 54a, the second ribs 54b, the third ribs 54c) which extend from the covering portions 500, 501, 503 (the beam covering portion 500, the first connection covering portion 501, the third connection covering portion 503) toward a side opposite to the seal portions 53a, 53b, 53c (the first seal portion 53a, the second seal portion 53b, the third seal portion 53c) and oppositely face the end surfaces ESa, ESb, ESd of the opposedly facing portions 410a, 410b, 410d (the other beam portion 410a, the first connecting portion 410b, the third connecting portion 410d), and the ribs 54 (the first ribs 54a, the second ribs 54b, the third ribs 54c) extend from the end portions Ea1, Eb1, Ed1, Ed2 (the first end portions Ea1, Eb1, Ed1 and the second end portion Ed2) of the covering portions 500, 501, 503 (the beam covering portion 500, the first connection covering portion 501, the third connection covering portion 503) respectively.

With such a configuration, the ribs 54 (the first ribs 54a, the second ribs 54b, the third ribs 54c) cover the end surfaces ESa, ESb, ESd of the opposedly facing portions 410a, 410b, 410d (the other beam portion 410a, the first connecting portion 410b, the third connecting portion 410d). With such a configuration, when a water droplet which reaches the seal portion 53a, 53b, 53c (the first seal portion 53a, the second seal portion 53b, the third seal portion 53c) flows to the outside, the ribs 54 (the first ribs 54a, the second ribs 54b, the third ribs 54c) prevent adhesion of the water droplet to the opposedly facing portions 410a, 410b, 410d (the other beam portion 410a, the first connecting portion 410b, the third connecting portion 410d).

Further, the ribs 54 (the first ribs 54a, the second ribs 54b, the third ribs 54c) which opposedly face the end surfaces ESa, ESb, ESd of the opposedly facing portions 410a, 410b, 410d (the other beam portion 410a, the first connecting portion 410b, the third connecting portion 410d) extend from the end portions Ea1, Eb1, Ed1, Ed2 (the first end portions Ea1, Eb1, Ed1 and the second end portion Ed2) of the covering portions 500, 501, 503 (the beam covering portion 500, the first connection covering portion 501, the third connection covering portion 503) and hence, even when the ribs 54 (the first ribs 54a, the second ribs 54b, the third ribs 54c) are formed, there is no possibility that the flow of the water droplet is impaired.

The rib 54 (the first ribs 54a, the second ribs 54b, the third ribs 54c) has the proximal end connected to the covering portion 500, 501, 503 (the beam covering portion 500, the first connection covering portion 501, the third connection covering portion 503) and the distal end on a side opposite to the proximal end, and the distal end of the rib 54 (the first ribs 54a, the second ribs 54b, the third ribs 54c) extends to the outside of the opposedly facing portion 410a, 410b, 410d (the other beam portion 410a, the first connecting portion 410b, the third connecting portion 410d).

With the above-mentioned configuration, the rib 54 (the first ribs 54a, the second ribs 54b, the third ribs 54c) guides a water droplet W to the outside of the opposedly facing portion 410a, 410b, 410d (the other beam portion 410a, the first connecting portion 410b, the third connecting portion 410d). Accordingly, the adhesion of a water droplet W to the opposedly facing portion 410a, 410b, 410d (the other beam portion 410a, the first connecting portion 410b, the third connecting portion 410d) can be suppressed.

The ribs 54 (the first ribs 54a, the second ribs 54b, the third ribs 54c) respectively have: the first surfaces Sd1, Se1, Sf1 which opposedly face the end surfaces ESa, ESb, ESd of the opposedly facing portions 410a, 410b, 410d (the other beam portion 410a, the first connecting portion 410b, the third connecting portion 410d) in the direction orthogonal to the end surfaces ESa, ESb, ESd, and the second surfaces Sd2, Se2, Sf2 on a side opposite to the first surfaces Sd1, Se1, Sf1, and the second surfaces Sd2, Se2, Sf2 are formed so as to be inclined downwardly from a proximal end to a distal end.

With above-mentioned configuration, due to the inclination of the second surfaces Sd2, Se2, Sf2 of the ribs 54 (the first ribs 54a, the second ribs 54b, the third ribs 54c), a water droplet W flows toward the distal end of the ribs 54 (the first ribs 54a, the second ribs 54b, the third ribs 54c). Accordingly, it is possible to discharge a water droplet W to the outside of the opposedly facing portions 410a, 410b, 410d (the other beam portion 410a, the first connecting portion 410b, the third connecting portion 410d) with certainty.

It is needless to say that the energy storage apparatus of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

In the above-mentioned embodiment, the insulator 5 includes the ribs 54. However, the present invention is not limited to such a configuration. For example, the insulator 5 may be configured to include only the covering portions (the beam covering portion 500, the first connection covering portion 501, the second connection covering portion 502, the third connection covering portion 503) which cover the body portion 410 of the connecting member 41 and the seal portions 53 (the first seal portion 53a, the second seal portion 53b, and the third seal portion 53c). However, by taking into account a water discharging property of a water droplet, it is needless to say that it is preferable to include the ribs 54 in the same manner as the above-mentioned embodiment. When the insulator 5 does not include the ribs 54, the end portions Ea1, Eb1, Ed1, Ed2 (the first end portions Ea1, Eb1, Ed1, Ed2 and the second end portions Ed2) of the covering portions (the beam covering portion 500, the first connection covering portion 501, the third connection covering portion 503) may be configured to agree with or substantially agree with the end surfaces ESa, ESb, ESd of the opposedly facing portions 410a, 410b, 410d (the beam portion 410a, the first connecting portion 410b, the third connecting portion 410d) in the direction orthogonal to the end surfaces ESa, ESb, ESd. Also with such a configuration, the seal portions 53 (the first seal portion 53a, the second seal portion 53b, and the third seal portion 53c) are extended from the end portions Ea1, Eb1, Ed1, Ed2 (the first end portions Ea1, Eb1, Ed1, Ed2 and the second end portions Ed2) of the covering portions (the beam covering portion 500, the first connection covering portion 501, the third connection covering portion 503) and hence, a space where a water droplet is pooled is not formed so that the water droplet W can be discharged to the outside.

In the above-mentioned embodiment, the seal portions 53 (the first seal portion 53a, the second seal portion 53b, the third seal portion 53c) of the insulator 5 are brought into contact with the neighboring members 3 (the first neighboring member 31 (the first body portion 310 and the first restricting portions 311), the second neighboring members 32 (the second restricting portions 321), the third neighboring members 33 (the third body portions 330 and the third restricting portions 331)) included in the main part 1. However, the present invention is not limited to such a configuration. For example, the seal portions 53 (the first seal portion 53a, the second seal portion 53b, the third seal portion 53c) of the insulator 5 may be brought into contact with the energy storage devices 2 (the cases 21) included in the main part 1. When the main part 1 includes the plurality of energy storage devices 2, the seal portions 53 (the first seal portions 53a) which extend in the direction that the plurality of energy storage devices 2 are arranged parallel to each other may be brought into contact with both the energy storage devices 2 and the neighboring members 3 (the first neighboring member 31, the second neighboring members 32, the third neighboring members 33) included in the main part 1.

In the above-mentioned embodiment, along with the assumption that the posture where the safety valves 25 of the energy storage devices 2 are disposed on an upper side, the posture where the safety valves 25 of the energy storage devices 2 are directed in a horizontal direction, and the posture between the posture where the safety valves 25 of the energy storage devices 2 are disposed on an upper side and the posture where the safety valves 25 of the energy storage devices 2 are directed in a horizontal direction are assumed as the installation state of the energy storage apparatus PE, the seal portions 53 include the first seal portions 53a, the second seal portions 53b, and the third seal portions 53c. However, the present invention is not limited to such a configuration.

For example, when only the posture where the safety valves 25 of the energy storage devices 2 are disposed on an upper side is assumed as the installation state of the energy storage apparatus PE, the seal portions 53 may be constituted of only the first seal portions 53a. Further, when only the posture where the safety valves 25 of the energy storage devices 2 are directed in a horizontal direction is assumed as the installation state of the energy storage apparatus PE, the seal portions 53 may be constituted of at least either one of the second seal portions 53b and the third seal portions 53c. Further, when only the posture between the posture where the safety valves 25 of the energy storage devices 2 are disposed on an upper side and the posture where the safety valves 25 of the energy storage devices 2 are directed in a horizontal direction is assumed as the installation state of the energy storage apparatus PE, on the premise that the seal portions 53 are connected to each other, it is sufficient that the seal portions 53 are constituted of the first seal portions 53a and the second seal portions 53b or constituted of the second seal portions 53b and the third seal portions 53c. When the insulator 5 includes the ribs 54, it is sufficient that the ribs 54 (the first ribs 54a, the second ribs 54b, the third ribs 54c) are formed corresponding to the arrangement of the seal portions 53 (the first seal portions 53a, the second seal portions 53b, and the third seal portions 53c).

In the above-mentioned embodiment, the first seal portions 53a, the second seal portions 53b, the third seal portions 53c and the fourth seal portions 53d are connected to each other thus enclosing the plurality of flow passages included in the main part 1. However, the present invention is not limited to such a configuration. For example, in addition to the above-mentioned configuration, the seal portions 53 may include a seal portion which extends from the end portion Ec1, Ec2 (the first end portion Ec1 and the second end portion Ec2) of the second connection covering portion 502 toward the main part 1 and closes the gap between the main part 1 and the connecting member 41, and is connected to the first seal portion 53a and the fourth seal portion 53d.

With such a configuration, the seal portion 53 is disposed corresponding to the profile of the opening portion 414 of the connecting member 41 so that the seal portion 53 surrounds the flow passages for allowing a fluid to pass therethrough. Accordingly, in the same manner as the above-mentioned embodiment, a fluid is efficiently guided to the flow passages formed between the energy storage devices 2. Further, in a case where only the posture where the safety valves 25 of the energy storage devices 2 are directed in a horizontal direction is assumed as the installation state of the energy storage apparatus PE, the seal portion which extends from the end portions Ec1, Ec2 (the respective first end portion Ec1 and second end portion Ec2) of the second connection covering portion 502 receives a water droplet W in the same manner as the second seal portion 53b and the third seal portion 53c. Accordingly, the water droplet W is discharged to the outside through the seal portion without pooling in the gap formed between the connecting member (opposedly facing member) 41 and the main part 1.

In the above-mentioned embodiment, although the main part 1 is partitioned into two blocks B1, B2 with the first neighboring member 31 as a boundary, the present invention is not limited to such a configuration. For example, between the pair of third neighboring members 33, only the energy storage devices 2 and the second neighboring members 32 may be disposed. In this case, in the connecting member 41, the third connecting portion 410d becomes unnecessary, and the plurality of second connecting portions 410c exist between the pair of first connecting portions 410b and hence, also in the insulating member (insulator) 5, the third connection covering portion 503 is eliminated, and only the second connection covering portion 502 is disposed between the pair of first connection covering portions 501.

With such a configuration, the seal portion 53 may be disposed along the pair of beam covering portions 500 and the pair of first connection covering portions 501. That is, the seal portions 53 may be configured to include only the first seal portions 53a, the second seal portions 53b, and the fourth seal portions 53d thus enclosing the plurality of the whole flow passages and substantially the whole flow passages included in the main part 1. Further, the seal portions 53 may be configured to include a seal portion extending from the end portion Ec1, Ec2 (the first end portion Ec1, the second end portion Ec2) of the second connection covering portion 502, and may be formed into an annular shape for every opening portion 414 formed in the connecting member 41 as described above.

In the above-mentioned embodiment, the seal portions 53 of the insulator 5 include the fourth seal portion 53d which extends from the first end portion of one beam covering portion 500. However, the present invention is not limited to such a configuration. For example, it is sufficient that the fourth seal portion 53d is provided when necessary. In the above-mentioned embodiment, the seal portion 53 is formed for guiding a fluid for adjusting a temperature of the energy storage device 2 which is supplied to the energy storage apparatus PE to the necessary portion (the flow passages) and hence, when such a function is required, it is needless to say that the seal portions 53 include the fourth seal portion 53d. The fourth seal portion 53d is disposed on an external terminal 20 (safety valve 25) side of the energy storage device 2. Accordingly, there is no possibility that the fourth seal portion 53d receives a water droplet and hence, the fourth seal portion 53d may extend on a second end portion side rather than on a first end portion of one beam covering portion 500.

In the above-mentioned embodiment, the second surfaces Sd2, Se2, Sf2 of the first rib 54a, the second rib 54b and the third rib 54c are respectively formed into an inclined surface which is inclined downwardly toward a distal end. However, the present invention is not limited to such a configuration. For example, the second surfaces Sd2, Se2, Sf2 of the first rib 54a, the second rib 54b, and the third rib 54c may be formed into a flat surface (a flat surface expanding in the X axis direction and in the Y axis direction) perpendicular to the Z axis direction. Here, to enhance a water discharge property, it is preferable to adopt a configuration substantially equal to the above-mentioned configuration.

In the above-mentioned embodiment, the first end portion Ea1 of the other beam covering portion 500 projects slightly from the end surface ESa of the beam portion 410a of the connecting member 41 in the Z axis direction (positioned slightly outside the end surface ESa). However, the present invention is not limited to such a configuration. For example, the first end portion Ea1 of the other beam covering portion 500 may be disposed outside largely remote from the end surface ESa of the beam portion 410a of the connecting member 41 in the Z axis direction. Also with such a configuration, since the first seal portion 53a extends from the first end portion Ea1 of the other beam covering portion 500, in the same manner as the above-mentioned embodiment, a water droplet can be discharged without being pooled. In this case, the first rib 54a may extend from the first end portion Ea1 of the beam covering portion 500, or may extend from a position between the first end portion Ea1 of the beam covering portion 500 and the end surface ESa of the beam portion 410a.

In the above-mentioned embodiment, the first end portion Eb1 of the first connection covering portion 501 projects slightly from the end surface ESb of the first connecting portion 410b of the connecting member 41 in the X axis direction (positioned slightly outside the end surface ESb). However, the present invention is not limited to such a configuration. For example, the first end portion Eb1 of the first connection covering portion 501 may be disposed outside largely remote from the end surface ESb of the first connecting portion 410b of the connecting member 41 in the X axis direction. Also with such a configuration, since the second seal portion 53b extends from the first end portion of the first connection covering portion 501, in the same manner as the above-mentioned embodiment, a water droplet can be discharged without being pooled. In this case, the second rib 54b may extend from the first end portion Eb1 of the first connection covering portion 501, or may extend from a position between the first end portion Eb1 of the first connection covering portion 501 and the end surface ESb of the first connecting portion 410b.

In the above-mentioned embodiment, the first end portion Ed1 and the second end portion Ed2 of the third connection covering portion 503 respectively project slightly from the end surface ESc of the third connecting portion 410d of the connecting member 41 in the X axis direction (positioned slightly outside the end surface ESc). However, the present invention is not limited to such a configuration. For example, at least one of the first end portion Ed1 and the second end portion Ed2 of the third connection covering portion 503 may be disposed outside largely remote from the end surface ESd of the third connecting portion 410d of the connecting member 41 in the X axis direction. Also with such a configuration, since the third seal portion 53c extends from the first end portion Ed1 and the second end portion Ed2 of the third connection covering portion 503, in the same manner as the above-mentioned embodiment, a water droplet can be discharged without being pooled. In this case, the third rib 54c may extend from the end portions Ed1, Ed2 (the first end portion Ed1 and the second end portion Ed2) of the third connection covering portion 503, or may extend from positions between the end portions Ed1, Ed2 (the first end portion Ed1 and the second end portion Ed2) of the third connection covering portion 503 and the end surface ESd of the third connecting portion 410d.

In the above-mentioned embodiment, the description has been made with respect to the case where the energy storage device 2 is used as a non-aqueous electrolyte secondary battery (for example, lithium ion secondary battery) which can charge electricity and discharge electricity. However, a kind, a size (a capacity) of the energy storage device 2 can be arbitrarily set. Further, in the above-mentioned embodiment, the description has been made with respect to the lithium ion secondary battery as one example of the energy storage device 2. However, the energy storage device 2 is not limited to the lithium ion secondary battery. For example, the present invention is also applicable to an energy storage device 2 for various secondary batteries, a primary battery, or a capacitor such as an electric double-layered capacitor.

What is claimed is:

1. An energy storage apparatus, comprising:
   a main part including at least one energy storage device;
   a conductive opposedly facing member disposed so as to opposedly face the main part; and
   an insulating member disposed between the main part and the opposedly facing member,
   wherein the opposedly facing member includes an opposedly facing portion where at least a part of the opposedly facing portion overlaps with the main part,
   wherein the opposedly facing portion includes an end surface disposed at a position where the end surface overlaps with the main part, the end surface facing upwardly in a state where the energy storage apparatus is installed,
   wherein the insulating member includes:
      a covering portion covering at least a surface of the opposedly facing portion directed toward the main part; and
      a seal portion extending from the covering portion toward the main part so as to close a gap formed between the main part and the covering portion,
   wherein the covering portion includes an end portion disposed at a position which agrees with the end surface of the opposedly facing portion or at a position outside the end surface in a direction orthogonal to the end surface, and
   wherein the seal portion extends from the end portion of the covering portion toward the main part.

2. The energy storage apparatus according to claim 1, wherein the insulating member further includes a rib which extends from the covering portion toward a side opposite to the seal portion and opposedly faces the end surface of the opposedly facing portion, and
   wherein the rib extends from the end portion of the covering portion or from a position between the end portion of the covering portion and the end surface of the opposedly facing portion in the direction orthogonal to the end surface.

3. The energy storage apparatus according to claim 2, wherein the rib includes a proximal end connected to the covering portion and a distal end on a side opposite to the proximal end, and
   wherein the distal end extends to outside of the opposedly facing portion.

4. The energy storage apparatus according to claim 3, wherein the rib includes a first surface which opposedly faces the end surface of the opposedly facing portion, and a second surface disposed on a side opposite to the first surface in the direction orthogonal to the end surface, and
   wherein the second surface is formed so as to be inclined downwardly from the proximal end to the distal end.

5. The energy storage apparatus according to claim 1, wherein the at least one energy storage device of the main part includes a plurality of energy storage devices arranged in a first direction, and
   wherein the seal portion extends from the end portion of the covering portion toward the main part in a second direction orthogonal to the first direction.

6. The energy storage apparatus according to claim 1, wherein the seal portion extends from the end portion of the covering portion toward the main portion such that a space where a liquid droplet is pooled is not formed between the main part and the covering member.

7. The energy storage apparatus according to claim 1, wherein the seal portion extends from the end portion of the covering portion toward the main portion to completely seal a space between the main part and the covering member.

8. The energy storage apparatus according to claim 1, wherein, in the direction orthogonal to the end surface, the end portion is disposed at the position which overlaps with the end surface of the opposedly facing portion.

9. The energy storage apparatus according to claim 1, wherein, in the direction orthogonal to the end surface, the end portion is disposed at the position outside the end surface.

10. The energy storage apparatus according to claim 1, wherein the at least one energy storage device of the main part includes a plurality of energy storage devices arranged in a first direction, and
    wherein an entirety of the seal portion extends, in a second direction orthogonal to the first direction, from the end portion of the covering portion toward the main part.

11. The energy storage apparatus according to claim 10, wherein the insulating member further includes a rib which extends from the covering portion in an opposite direction to the second direction.

12. The energy storage apparatus according to claim 11, wherein an entirety of the rib extends in the second direction.

13. The energy storage apparatus according to claim 1, wherein the insulating member further includes a rib which extends from the covering portion in an opposite direction to a direction that the seal portion extends toward the main part.

14. The energy storage apparatus according to claim 1, wherein the insulating member further includes a rib which extends, from a position between the end portion of the covering portion and the end surface of the opposedly facing portion, in an opposite direction to a direction that the seal portion extends toward the main part.

15. The energy storage apparatus according to claim 1, wherein the at least one energy storage device of the main part includes a plurality of energy storage devices arranged in a first direction, wherein the seal portion includes a proximal end connected to the covering portion and a distal end on a side opposite to the proximal end, the seal portion extending from the proximal end to the distal end in a second direction orthogonal to the first direction.

16. The energy storage apparatus according to claim 15, wherein the seal portion continuously extends from the proximal end to the distal end in a second direction orthogonal to the first direction.

17. An energy storage apparatus, comprising:
   a main part including a plurality of energy storage devices;
   opposedly facing member-disposed so as to opposedly face the main part; and
   an insulating member disposed between the main part and the opposedly facing member,
   wherein the opposedly facing member includes an opposedly facing portion that overlaps with the main part,
   wherein the opposedly facing portion includes an end surface disposed at a position where the end surface overlaps with the main part,
   wherein the insulating member includes:
      a covering portion covering at least a surface of the opposedly facing portion directed toward the main part; and
      a seal portion extending from the covering portion toward the main part so as to close a gap between the main part and the covering portion, and
   wherein the seal portion extends from an end portion of the covering portion toward the main part in a direction orthogonal to a stacking direction of the plurality of energy storage devices.

18. The energy storage apparatus according to claim 17, wherein the seal portion extends from the end portion of the covering portion toward the main portion such that a space where a liquid droplet is pooled is not formed between the main part and the covering member.

19. The energy storage apparatus according to claim 17, wherein the seal portion extends from the end portion of the covering portion toward the main portion to completely seal a space between the main part and the covering member.

20. The energy storage apparatus according to claim 17, wherein the seal portion includes a proximal end connected to the covering portion and a distal end on a side opposite to the proximal end, the seal portion continuously extending from the proximal end to the distal end in the direction orthogonal to the stacking direction of the plurality of energy storage devices.

* * * * *